United States Patent Office 3,116,282
Patented Dec. 31, 1963

3,116,282
PYRIMIDINE NUCLEOSIDES AND PROCESS
James H. Hunter, Kalamazoo, Mich., assignor to The Upjohn Company, Kalamazoo, Mich., a corporation of Delaware
No Drawing. Filed Apr. 27, 1960, Ser. No. 24,890
31 Claims. (Cl. 260—211.5)

This invention relates to a novel chemical process, and to compounds produced thereby. More particularly, the invention is directed to a process for preparing important naturally occurring cytosine-1-nucleosides, heretofore unknown cytosine-1-nucleosides, and novel 4-thiouracil-1-nucleoside intermediates.

This invention is concerned with chemical compounds of great biological significance. For example, the naturally occurring cytosine-1-nucleosides synthesized by the process of this invention are fundamental components of living matter. They are found in all living cells as esters of phosphoric acid (nucleotides) variously linked with similar purine nucleotides in the form of nucleic acids.

Nucleic acids have been classified into two types according to the nature of the sugar moiety attached to the purine and pyrimidine bases. Accordingly, uracil and cytosine (4-amino-2(1H)pyrimidone) ribofuranosides are pyrimidine nucleosides found in ribonucleic acids (RNA); and 5-methyluracil (thymine), cytosine, and 5-methylcytosine deoxyribofuranosides are pyrimidine nucleosides found in deoxyribonucleic acids (DNA). Thus, it is seen that both RNA and DNA contain pyrimidine bases having an amino group in the 4-position of the pyrimidine moiety.

According to the generally accepted concepts of modern biochemical theory, ribo- and deoxyribonucleic acids are the quintessence in cellular organization. Deoxyribonucleic acids, especially, are associated with the nuclear matrix of cells, and are believed to be concerned with the genetic control of metabolic functions. Hence, evaluation of the physiological and chemotherapeutic activity of 4-aminopyrimidine nucleosides is particularly desirable.

Prior to this invention, a method for preparing hexose nucleosides of uracil and cytosine had been known for some years [see Hilbert and Johnson, J. Am. Chem. Soc., 52, 4489–4494 (1930); and Hilbert and Jansen, J. Am. Chem. Soc., 58, 60–62 (1936)]. The naturally-occurring ribofuranoside of cytosine was prepared synthetically according to this general method, by Howard et al. (J. Chem. Soc. 1947, 1050–1054), but the yield was very poor. More recently, Fox and Goodman [J. Am. Chem. Soc., 73, 3256–3258 (1951)] prepared other cystosine-1-glycopyranosides by the Hilbert-Jansen method. However, the method is not satisfactory for preparing glycofuranosides.

The process of the present invention overcomes the disadvantages and limitations of the prior art and is a significant contribution to the art, because it provides a convenient process for converting commercially available nucleosides such as uridine and thymidine, as well as other uracil-1-nucleosides, into their corresponding 4-amino analogues. The process also is of particular value for producing heretofore unknown cytosine-1-nucleosides. The conversion of thymidine to its 4-amino-analogue, 1-(2-deoxy-β-D-ribofuranosyl)-5-methylcytosine, is particularly advantageous because this nucleoside occurs in such small amounts in the deoxyribonucleic acids of tissue cells. It is now possible, by the process of this invention, to readily and cheaply prepare quantities of this rare, naturally-occurring nucleoside.

The new process provides a convenient synthesis of cytosine-1-nucleosides having the following general formula:

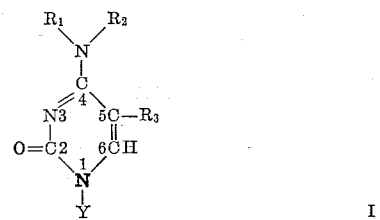

wherein Y is any nucleosidic sugar group,

is the amino radical of any basic nitrogenous compound, and $R_3$ is hydrogen or a non-interfering substituent.

Synthesis of cytosine-1-nucleosides of the foregoing Formula I is accomplished, according to the process of the invention, in the following manner. A uracil-1-nucleoside is acylated; this step is necessary in order to block the hydroxyl groups of the sugar moiety of the nucleoside, and to block any acylatable group such as hydroxyl that may be attached to carbon 5 of the uracil nucleus. The fully acylated uracil-1-nucleoside is then reacted with phosphorus pentasulfide, whereby the 4-oxo group is replaced by a 4-thio group to produce the corresponding fully acylated 4-thiouracil-1-nucleoside. The fully acylated 4-thiouracil-1-nucleoside is then reacted with any basic nitrogenous compound having a replaceable N-hydrogen to produce cytosine-1-nucleoside. Advantageously, the substitution of an amino group for the thio group can be effected concurrently with deacylation. Alternatively, the fully acylated 4-thiouracil-1-nucleoside can be deacylated so as to remove the acyl groups, and the resulting 4-thiouracil-1-nucleoside then reacted with the basic nitrogenous compound. The resulting cytosine-1-nucleoside is the same by either procedure.

For purposes of illustration, a preferred form of the process of the invention is schematically represented as follows:

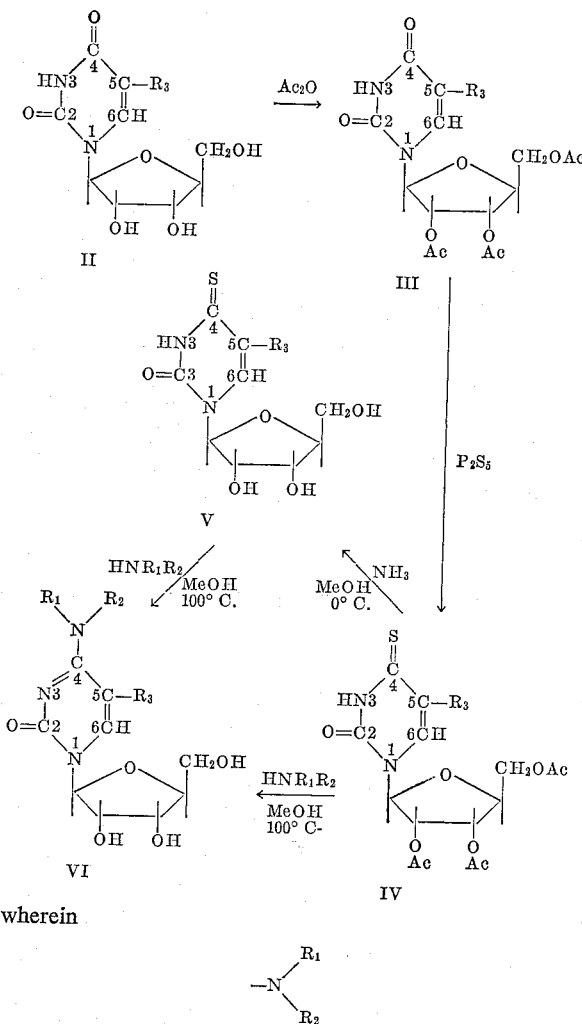

wherein $$-N\begin{matrix}R_1\\R_2\end{matrix}$$

and $R_3$ are as indicated above and Ac is an acyl group.

While in the foregoing schematic representation, the glycosido group has been represented as that of β-D-ribofuranose, it will be understood that this is not an essential feature of the process of this invention. Thus the process of this invention is applicable to any uracil-1-nucleoside independently of the character of the sugar moiety or glycosido group. For example, the glycosido group can be that of any D- or L-pentose or hexose sugar such as the D- and L-riboses, xyloses, arabinoses, lyxoses, guloses, mannoses, alloses, altroses, galactoses, glucoses, deoxyriboses, deoxyxyloses, deoxyglucoses, and the like, either in the furanose or pyranose form and in either the α or β configuration. Since the sugar moiety does not undergo transformation in the process, it will have the same form and configuration in the final product as it does in the starting compound.

Some of the uracil-1-nucleosides which are the starting compounds of the process of the invention are readily available commercially. For example, 1-β-D-ribofuranosyluracil (uridine) and 1-(2-deoxy-β-D-ribofuranosyl)-5-methyl-uracil (thymidine) are obtained by degradation of nucleic acids. Hence, naturally-occurring uracil-1-nucleosides can be acylated according to methods well-known in the art, for example, as described in the examples included in this specification, and utilized in the process of this invention to prepare cytosine-1-nucleosides.

Other uracil-1-nucleosides having sugar groups different from naturally occurring ones can be prepared according to the methods described by Hilbert and Jansen, loc. cit., Fox and Goodman, loc. cit., and Fox et al., J. Am. Chem. Soc., 78, 2117 (1956). Another method for obtaining the starting uracil-1-nucleosides with variations in the sugar groups is accomplished by epimerization reactions whereby one sugar group is converted into an epimer, for example: xylofuranosyl to lyxofuranosyl, or ribofuranosyl to arabinofuranosyl. Conversion of the sugar groups by epimerization is particularly advantageous when it is desired to prepare the nucleosides of the invention having the naturally-occurring β-configuration.

5-substituted uracil-1-nucleosides can be prepared advantageously by the method of Fox et al., loc. cit., by condensing a mercury complex of a 5-substituted uracil with a suitable polyacylhalogenose. For this purpose any uracil nucleus bearing non-interfering groups on carbon 5 can be used. Typical non-interfering substituent groups include alkyl containing from 1 to 8 carbon atoms, inclusive, for example, methyl, ethyl, propyl, butyl, amyl, hexyl, octyl, and isomeric forms thereof; alkenyl containing from 3 to 8 carbon atoms, inclusive, for example, allyl, methylallyl, crotyl, octenyl, and the like; aryl containing from 6 to 10 carbon atoms, inclusive, for example, phenyl, o-, m-, and p-tolyl, α- and β-naphthyl, and the like; aralkyl containing from 7 to 10 carbon atoms, inclusive, for example, benzyl, α- and β-phenethyl, phenylbutyl, and the like; cycloalkyl containing from 4 to 8 carbon atoms, inclusive, for example, cyclobutyl, cyclopentyl, cyclohexyl, methylcycloheptyl, and the like; cycloalkenyl containing from 4 to 8 carbon atoms, inclusive, for example, cyclobutenyl, cyclopentadienyl, cyclohexenyl, ethylcyclohexenyl, and the like; hydroxyl, nitro, and like inorganic substituents. The alkyl, alkenyl, cycloalkyl, cycloalkenyl, aryl and aralkyl groups can also carry these inorganic substituents. Suitable methods for preparing 5-substituted uracils are known in the art [see, for example, Gilman, "Organic Chemistry," vol. 4 (1953), pp. 866 et seq.; and Burckhalter and Scarborough, J. Am. Pharm. Ass'n 44, 545–550 (1955)].

Acylation of a uracil-1-nucleoside is accomplished by reaction with the acid anhydride or the acid chloride of any monocarboxylic acid such as for example, acetic anhydride, acetyl chloride, or benzoyl chloride, and like acylating reagents. Advantageously, the monocarboxylic acid is a hydrocarbon carboxylic acid containing from 2 to 12 carbon atoms, inclusive.

Suitable such acids include (a) a saturated or unsaturated straight or branched chain aliphatic carboxylic acid such as acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated cycloaliphatic carboxylic acid such as cyclobutane-carboxylic acid, cyclopentane-carboxylic acid, cyclopentene-carboxylic acid, methylcyclopentene-carboxylic acid, cyclohexane-carboxylic acid, dimethylcyclohexene-carboxylic acid, dipropylcyclohexane-carboxylic acid, and the like; (c) a saturated or unsaturated cycloaliphatic-substituted aliphatic carboxylic acid such as cyclopentane-acetic acid, cyclopentane-propionic acid, cyclopentene-acetic acid, cyclohexane-butyric acid, methylcyclohexane-acetic acid, and the like; (d) an aromatic carboxylic acid such as benzoic acid, toluic acid, naphthoic acid, ethylbenzoic acid, isobutylbenzoic acid, methylbutylbenzoic acid, and the like; and (e) an aromatic-aliphatic carboxylic acid such as phenylacetic acid, phenylpropionic acid, phenylvaleric acid, cinnamic acid, phenylpropiolic acid, and naphthylacetic acid, and the like.

The hydrocarbon monocarboxylic acids as hereinbefore defined can also be substituted by one or more halogen atoms, nitro, hydroxy, amino, cyano, thiocyano, or lower-alkoxy groups. By "lower-alkoxy" is meant an alkoxy group containing from one to six carbon atoms, inclusive, such as methoxy, ethoxy, propoxy, butoxy, amyloxy, hexyloxy, and isomeric forms thereof. Examples of substituted hydrocarbon carboxylic acid acyl radicals falling within the above definition are the acyl radicals corresponding to chloroacetic acid, chloropropionic acid, bromobutyric acid, iodovaleric acid, chlorocyclohexanecarboxylic acid, o-, m-, and p-chlorobenzoic acid, anisic acid, salicylic acid, p-hydroxybenzoic acid, o-, m-, and p-nitrobenzoic acid, cyanoacetic acid, thiocyanoacetic acid, cyanopropionic acid, lactic acid, glycine, and the like.

Substitution of a thio group for the oxygen at the 4-position of the fully acylated uracil-1-nucleoside is accomplished by reaction with phosphorus pentasulfide in the presence of a weakly basic organic solvent such as pyridine, lutidine, collidine, and the like. Although the reaction is mildly exothermic, it is generally advantageous for the reaction mixture to be heated, e.g., for several hours, advantageously at reflux temperature, in order to obtain good yields.

The fully acylated 4-thiouracil-1-nucleosides obtained according to the foregoing procedure are readily converted to cytosine-1-nucleosides by a substitution reaction (aminolysis) with a basic nitrogenous compound having a replaceable N-hydrogen. The substitution can be advantageously carried out at the same time the nucleoside is deacylated when higher reaction temperatures are employed. Accordingly, the nitrogenous base can be dissolved in a suitable solvent such as methanol, ethanol, and the like and reacted with the fully acylated 4-thiouracil-1-nucleoside at a temperature of about 60 to 175° C., preferably at a temperature of about 90 to 110° C., to produce the corresponding cytosine-1-nucleoside. It will be understood, of course, that reaction with ammonia or a low-boiling amine such as methylamine and the like should be carried out in a sealed reaction vessel in order to prevent loss of the volatile reagent at the temperatures indicated.

On the other hand, the fully acylated 4-thiouracil-1-nucleoside can be deacylated, and then reacted with the nitrogenous base to produce the cytosine-1-nucleoside. Deacylation of the 4-thiouracil-1-nucleosides is conveniently carried out with an alcohol solution of an ammonium base such as ammonia, an amine, a quaternary ammonium base, or hydrazine at a temperature of about −5 to +10° C., preferably about zero to +5° C. Suitable alcohols include ethanol and methanol. The 4-thio group of the deacylated nucleoside can then be substituted by the desired amino radical by reaction with the nitrogenous base at elevated temperatures as indicated above.

Any nitrogenous base having a replaceable N-hydrogen can be used in the process to replace the 4-thio group. Particularly suitable and therefore a preferred class of such bases include those having the formula

wherein $R_1$ and $R_2$ are selected from the class consisting of hydrogen; alkyl containing from 1 to 8 carbon atoms, inclusive, for example, methyl, ethyl, propyl, butyl, amyl, hexyl, octyl, and the like, and isomeric forms thereof; alkenyl containing from 3 to 8 carbon atoms, inclusive, for example, allyl, methallyl, crotyl, octenyl, and the like; aralkyl containing from 7 to 13 carbon atoms, inclusive, for example, benzyl, α- and β-phenethyl, benzhydryl, and the like; aryl containing from 6 to 10 carbon atoms, inclusive, for example, phenyl, o-, m-, and p-tolyl, α- and β-naphthyl, and the like; cycloalkyl containing from 4 to 8 carbon atoms, inclusive, for example, cyclobutyl, cyclopentyl, cyclohexyl, methylcycloheptyl, and the like; cycloalkenyl containing from 4 to 8 carbon atoms, inclusive, for example, cyclobutenyl, ethylcyclohexenyl, cyclopentenyl, cyclopentadienyl, cyclohexenyl, and the like; oxa-, thia-, and C-aza-mono-heterocyclic radicals, for example, thienyl, pyrrolyl, and the like; oxa-, thia-, and C-aza-mono-heterocyclic-lower-alkyl radicals, for example, furyl, γ-(2-thienyl)propyl, β,β-dimethyl-β-(2-furyl)ethyl, and the like; and $R_1$ and $R_2$ taken together with

is a heterocyclic radical containing from 3 to 7 ring members and no more than 10 carbon atoms, one of which, in addition to the imino nitrogen atom, is selected from the class consisting of carbon, nitrogen, oxygen and sulfur, the other ring members being carbon, for example, ethyleneimino, piperidino, 2-amylpiperidino, morpholino, pyrroleneimino, piperidino, 2-amylpiperidino, morpholino, pyrrolidino, 2,2 - dimethylpyrrolidino, thiamorpholino, hexamethyleneimino, piperazino, N - propylpiperazino, and the like.

The cytosine-1-nucleosides obtained by this invention readily form acid addition salts with acids, for example, with such acids as hydrochloric, picric, citric, succinic, maleic, tartaric, and fluosilicic acids. The acid addition salts are useful in purifying the free bases because of the difference in the solubilities and physical characteristics of the acid addition salts and the free bases (e.g., more ready crystallizability of the salts). The fluosilicate salts are useful for moth-proofing in accordance with U.S. Patents 1,915,334 and 2,075,359.

The novel cytosine-1-nucleosides obtained by this invention are also useful in chemotherapeutics and in metabolic reactions, and they constitute a readily available, biologically acceptable form of cytosine bases. They are also useful in the preparation of nucleotides by condensation with phosphoric acid in the presence of yeast enzymes according to the method described in U.S. Patent 2,844,514.

The novel cytosine-1-pentofuranosides of this invention, particularly the N-unsubstituted and the N-alkyl, 5-alkyl, and 5-hydroxy derivatives, are useful against microorganisms, for example, bacteria, fungi, viruses, and the like, and as antimetabolites and cell growth inhibitors.

The novel cytosine - 1 - arabinofuranosides are active against viruses and bacteria. The cytosine-1-β-D-arabinofuranosides are preferred antiviral and antibacterial agents. For example, 1 - β - D-arabinofuranosylcytosine and 1-β-D-arabinofuranosyl-N-methylcytosine inhibit the propagation of vaccinia virus. They can be used for preventing or controlling epizootics of viral etiology in mammals and birds. The compounds are active against the bacterium *Escherichia coli* and can be used to inhibit the propagation thereof. Also, nucleosides preparable by the process of this invention and nucleotides preparable therefrom, as indicated above, are useful in the formulation of culture media for both plant and animal tissue cells, bacteria, fungi, and culture media for viral propagation, and for the synthesis of polynucleotides related to nucleic acids.

The following examples are illustrative of the process and products of the present invention, but are not to be construed as limiting.

EXAMPLE 1.—PREPARATION OF 1β-D-RIBO-FURANOSYLCYTOSINE (CYTIDINE)

*Part A.—Preparation of 1-(2,3,5-Tri-O-Acetyl-β-D-Ribofuranosyl)Uracil*

A mixture of 4.31 g. (17.66 millimoles) of 1-β-D-ribofuranosyluracil, 30 ml. of acetic anhydride and 10 drops of pyridine was agitated intermittently while warming gently under a reflux condenser. Moisture was excluded from the reaction mixture. A reaction occurred suddenly and vigorously, accompanied by dissolution of the suspended particles and formation of a pale yellow solution. The solution was cooled, held at room temperature overnight, and then diluted with 58 ml. of absolute methanol. It was then concentrated to a small volume under reduced pressure at a bath temperature of about 40° C. The concentrate was dissolved in 220 ml. of water and the pH adjusted to 7.8 by the addition of saturated sodium bicarbonate solution. The aqueous solution was then extracted repeatedly with chloroform and the combined extracts were washed twice with water. The chloroform solution was then dried over anhydrous sodium sulfate and the solvent removed under reduced pressure at a bath temperature of about 40° C. The amorphous residue thus obtained was dissolved in absolute ethanol and the ethanol was then removed under reduced pressure while the bath temperature was allowed to reach 60° C. for a short time. The product, a foamy glass weighing 6.48 g., was dissolved in absolute ethanol and the ethanol was again evaporated under reduced pressure at a bath temperature of about 35° C. After holding the residue at 0.3 mm. pressure for 1.5 hours and 0.07 mm. pressure for one hour, 6.27 g. of 1-(2,3,5-tri-O-acetyl-β-D-ribofuranosyl)uracil was recovered.

*Part B.—Preparation of 1-(2,3,5-Tri-O-Acetyl-β-D-Ribofuranosyl)-4-Thiouracil*

A mixture of 1.85 g. (5.0 millimoles) of 1-(2,3,5-tri-O-acetyl-β-D-ribofuranosyl)uracil prepared in Part A and 1.24 g. (5.57 millimoles) of phosphorous pentasulfide was suspended in 30 ml. of pyridine and heated to gentle reflux. Moisture was excluded. The reaction mixture had become clear and homogeneous by the time the solvent had reached its boiling point. After about 30 minutes at boiling temperature, the reaction mixture became quite turbid, and a dark insoluble syrup began to separate. The mixture darkened progressively, and after 3 hours at reflux the supernatant solution was decanted into a mixture of ice and water. The residual syrup was washed several times with small portions of pyridine, and these washings were added to the ice-water mixture. This mixture was cloudy and a flocculent precipitate formed after standing for a short time. The suspension was filtered and the clear yellow filtrate was chilled and acidified with 50 ml. of cold 12 N sulfuric acid. A yellow flocculent precipitate began to form immediately, and after refrigeration overnight at 0° C., was collected on a filter, washed with ice-water, and dissolved in chloroform. The chloroform solution was washed four times with ice-water, twice with ice-cold 3 N sulfuric acid, twice with ice-cold saturated sodium bicarbonate solution, twice with ice-water, and then dried over anhydrous sodium sulfate. The chloroform was removed under reduced pressure at a bath temperature of about 40° C. leaving a yellow somewhat gummy residue. The yellow residue was taken up in absolute methanol which was then evaporated at reduced pressure at about 40° C. After holding the resulting pale, orange-yellow amorphous solid at 0.5 to 2 mm. pressure for 2 hours at a bath temperature of about 50° C., there was obtained 1.18 g. of 1-(2,3,5-tri-O-acetyl-β-D-ribofuranosyl)-4-thiouracil as a foamy yellow solid.

Ultraviolet absorption:

$\lambda_{max.}^{95\% \text{ EtOH}}$ 247–248 mµ ($A_M$ 4,436)

$\lambda_{min.}^{95\% \text{ EtOH}}$ 273–276 mµ ($A_M$ 2,254)

$\lambda_{max.}^{95\% \text{ EtOH}}$ 326–328 mµ ($A_M$ 19,031)

$A_M$ = molar absorbency

*Part C.—Preparation of 1-β-D-Ribofuranosyl-4-Thiouracil*

Five ml. of absolute methanol saturated with anhydrous ammonia at 0° C. was added to 193 mg. (0.5 millimole) of 1-(2,3,5-tri-O-acetyl-β-D-ribofuranosyl)-4-thiouracil prepared in Part B. The reaction vessel was closed tightly, immersed in an ice-bath, and swirled intermittently during 45 minutes; the resulting solution was held at 0° C. for 17 hours. The methanol and excess ammonia were then distilled under reduced pressure at a bath temperature of about 40° C., and the dark syrupy residue was taken up in absolute ethanol. After removing the ethanol at reduced pressure and a temperature of about 40° C., the residue was held at 0.5 mm. pressure for 6 hours at a bath temperature of about 40° C. It was then held under reduced pressure overnight; yield of straw colored glass, 140 mg.

Ultraviolet absorption:

$\lambda_{max.}^{95\% \text{ EtOH}}$ 248–250 mµ

$\lambda_{min.}^{95\% \text{ EtOH}}$ 275–278 mµ

$\lambda_{max.}^{95\% \text{ EtOH}}$ 331–332 mµ (intense)

The glass was dissolved in 2 ml. of water. This solution was treated with Darco G-60 (an activated, adsorbent charcoal), held at room temperature for 2 hours, filtered, and the filter-cake was washed with water. The aqueous solution was then lyophilized, yielding 95 mg. of 1-β-D-ribofuranosyl-4-thiouracil as a pale yellow glass.

*Part D.—Preparation of 1-β-D-Ribofuranosylcytosine (Cytidine)*

In a glass liner, a mixture of 773 mg. (2.0 millimoles) of the amorphous 1-(2,3,5-tri-O-acetyl-β-D-ribofuranosyl)-4-thiouracil prepared in Part B and 20 ml. of absolute methanol which had been saturated with anhydrous ammonia at 0° C. was heated in a steel bomb at 98 to 105° C. for 45 hours. The methanol and excess ammonia were removed under reduced pressure at a bath temperature of about 40° C. and the dark syrupy residue was dissolved in absolute ethanol. The ethanol was removed under reduced pressure at a bath temperature of about 50° C. and the residue was held under 0.01 mm. pressure for 3 hours. It was then kept at 50 mm. pressure and temperature of about 40° C. overnight. A crystalline sublimate was removed mechanically from the upper walls of the reaction vessel and the dark residue was dissolved in absolute methanol. The solution was swirled intermittently over a period of 3 hours with Darco G-60, filtered through a bed of shredded asbestos, and washed with a sufficient quantity of absolute methanol to bring the combined filtrate, containing 1-β-D-ribofuranosylcytosine, to a volume of 25 ml.

*Part E.—Preparation of 1-β-D-Ribofuranosylcytosine Hydrochloride (Cytidine Hydrochloride)*

Twenty ml. of the methanolic filtrate, prepared in Part D, was diluted with 15 ml. of anhydrous ether, and the faintly cloudy solution was chilled in an ice-bath while an excess of anhydrous hydrogen chloride was introduced. The solution first became turbid and then cleared; almost immediately, a fine granular solid began to deposit. After refrigeration at minus 20° C., the crude hydrochloride was collected, washed with a cold methanol-ether solution and dried in an oven at 85° C. The crude product weighed 375 mg. and its melting point was 200 to 202° C. (with decomposition). This crude material was dissolved in about 40 ml. of hot absolute methanol and decolorized with Darco G-60. The mixture was filtered and the filter-cake was washed with hot absolute methanol. The colorless filtrate (about 50 ml.) while still slightly warm, was diluted with one-half its volume of anhydrous ether. Colorless glistening needles began to form at once and the preparation was refrigerated at 0° C. for about 12 hours. The crystalline material was collected on a filter, washed with a cold methanol-ether solution and dried at 85° C. The crystals weighed 265 mg. and had a melting point of 208 to 210° C. with darkening and softening beginning at 204° C. Two further recrystallizations from methanol-ether yielded 175 mg. of 1-β-D-ribofuranosylcytosine hydrochloride as slender needles melting at 205 to 206.5° C.

*Analysis.*—Calculated for $C_9H_{14}ClN_3O_5$: C, 38.65; H, 5.05; Cl, 12.68; N, 15.02. Found: C, 39.19; H, 4.92; Cl, 12.56; N, 14.56.

Optical rotation: $[\alpha]_D^{24°}$ +44° (c. 0.9814, N NaOH).

Ultraviolet absorption:

$\lambda_{min.}^{0.1 \text{ N NaOH}}$ 250–252 mµ ($A_M$ 6,116)

$\lambda_{max.}^{0.1 \text{ N NaOH}}$ 271–273 mµ ($A_M$ 8,804)

$\lambda_{min.}^{0.1 \text{ N HCl}}$ 240–243 mµ ($A_M$ 1,624)

$\lambda_{max.}^{0.1 \text{ N HCl}}$ 279–280 mµ ($A_M$ 13,193)

Characteristic infrared absorption frequencies (cm.$^{-1}$): 3485, 3340, 3120, 3060; 1714; 1580, 1538; 1116.

$R_f$ 0.10 (81% n-butanol, descending).

*Part F.—Preparation of 1-β-D-Ribofuranosylcytosine Picrate (Cytidine Picrate)*

Five ml. of the methanolic filtrate, prepared in Part D, was diluted with an equal volume of water; and 20 ml. of a 1.6% aqueous picric acid solution was added. Upon scratching the walls of the reaction vessel a voluminous yellow precipitate was deposited rapidly. The mixture was allowed to stand at room temperature for 1 hour and was then refrigerated at 0° C. The precipitate was collected on a filter, washed with ice-water, and air dried, yielding 145 mg. of crude material. After crystallization from 95% ethanol, the product weighed 95 mg. and melted at 180 to 181° C. Recrystallization from 95% ethanol gave 85 mg. of bright yellow crystalline 1-β-D-ribofuranosylcytosine picrate which melted at 183 to 195° C. A melting point of 192 to 193° C. was also observed on more rapid heating.

*Analysis.*—Calculated for $C_{15}H_{16}N_6O_{12}$: C, 38.14; H, 3.41; N, 17.79. Found: C, 38.93; H, 3.35; N, 18.19.

Characteristic infrared absorption frequencies (cm.$^{-1}$): 3560, 3480, 3370, 3120; 1719; 1661; 1631, 1605, 1570, 1540; 1332, 1310, 1105, 1085, 1066, 1037.

EXAMPLE 2.—PREPARATION OF 1-(2-DEOXY-β-D-RIBOFURANOSYL) - 5 - METHYLCYTOSINE (5-METHYLCYTOSINE DEOXYRIBOSIDE)

*Part A.—Preparation of 1-(3,5-Di-O-Acetyl-2-Deoxy-β-D-Ribofuranosyl)-5-Methyluracil*

Twelve and one-tenth g. (0.05 mole) of 1-(2-deoxy-β-D-ribofuranosyl)-5-methyluracil was suspended in 600 ml. of acetic anhydride in a flask equipped with a sealed mechanical stirrer, reflux condenser, and a dropping funnel. External moisture was excluded from the reaction vessel and 50 ml. of pyridine was added dropwise with continuous stirring during 15 minutes, while the reaction mixture was held at a temperature between 65 and 70° C. The resulting solution was stirred for an additional 5.5 hours while the bath temperature was maintained at 60 to 72° C. The reaction mixture was cooled and allowed to stand at room temperature for 12 hours. The volatile components were then removed under 0.2 mm. pressure at a bath temperature of about 50° C. The residual syrup thus obtained was taken up in absolute methanol, and the methanol was then removed under 0.2 mm. pressure at a bath temperature of about 40° C. Solution in methanol and distillation at reduced pressure was repeated 3 times. A foamy amorphous residue thus obtained was dissolved in absolute ethanol and the ethanol was evaporated at reduced pressure at a bath temperature of about 40° C. until the concentrate became distinctly turbid and a heavy syrup began to separate. The syrup was redissolved by warming gently and the walls of the flask were rinsed with a small volume of absolute ethanol. The solution was seeded and allowed to crystallize at room temperature. After 3 days, followed by refrigeration at 0° C. for 2 days, the crystals were filtered, washed with cold 95% ethanol, and dried in air, yielding 10.86 g. of product. The mother liquor when refrigerated at 0° C. overnight yielded an additional 2.83 g. of product. The two crops of crystals were combined, dissolved in 75 ml. of hot absolute ethanol, and swirled with Darco G-60. The suspension was filtered and the filter-cake rinsed with 15 ml. of hot ethanol. The filtrate was seeded, kept at room temperature overnight, and then at 0° C. for 24 hours. The crystals which separated were recovered on a filter, washed with cold absolute ethanol, and dried in air. They weighed 9.43 g. and had a melting point of 118 to 120° C. Recrystallization from absolute ethanol gave 6.12 g. of 1 - (3,5 - di-O-acetyl-2-deoxy-β-D-ribofuranosyl)-5-methyluracil melting at 126 to 127° C.

*Part B.—Preparation of 1-(3,5-Di-O-Acetyl-2-Deoxy-β-D-Ribofuranosyl)-4-Thio-5-Methyluracil*

Thirty ml. of pyridine was added to a mixture consisting of 1.63 g. (5.0 millimoles) of 1-(3,5-di-O-acetyl-2-deoxy-β-D-ribofuranosyl)-5-methyluracil and 1.24 g. (5.57 millimoles) of phosphorus pentasulfide. While external moisture was excluded, the reaction mixture was kept under gentle reflux for 4.5 hours. An orange-colored solution separated and was decanted from a small amount of dark viscous syrup into a mixture of 100 ml. of water and about 50 g. of crushed ice. The dark syrup was extracted several times with pyridine and the extracts were added to the ice-water mixture. The chilled, clear yellow, aqueous solution was acidified with 50 ml. of cold 12 N sulfuric acid, whereupon a yellow flocculent precipitate was produced. After further refrigeration, the yellow semi-solid precipitate was collected on a filter, washed with ice-water, and taken up in chloroform. The chloroform solution was washed twice with ice-water, twice with ice-cold 3 N sulfuric acid, twice with ice-cold saturated sodium bicarbonate solution, twice with ice-water, and then dried over anhydrous sodium sulfate. The chloroform was then removed under reduced pressure at a temperature of about 40° C. and the residue was taken up in absolute methanol. The methanol was evaporated under reduced pressure, yielding 1-(3,5-di-O-acetyl-2-deoxy-β-D-ribofuranosyl)-4-thio-5-methyluracil as a foamy, citron-yellow solid.

Ultraviolet absorption:

$\lambda_{max.}^{95\% \text{ EtOH}}$ 243–244 m$\mu$ ($A_M$ 4,214)

$\lambda_{min.}^{95\% \text{ EtOH}}$ 275–278 m$\mu$ ($A_M$ 2,337)

$\lambda_{max.}^{95\% \text{ EtOH}}$ 332–333 m$\mu$ ($A_M$ 18,764)

Characteristic infrared absorption frequencies (cm.$^{-1}$): 3220, 3100; 1741; 1706; 1635; 1237.

*Part C.—Preparation of 1-(2-Deoxy-β-D-Ribofuranosyl)-4-Thio-5-Methyluracil*

A quantity, 161 mg. (0.5 millimole), of 1-(3,5-di-O-acetyl - 2-deoxy-β-D-ribofuranosyl)-4-thio-5-methyluracil prepared in Part B was treated with 5 ml. of methanolic ammonia (saturated at 0° C.) in a reaction vessel which was then tightly closed and immersed in an ice-bath. The reaction mixture was swirled intermittently during the first 45 minutes, and the resulting solution was held at 0° C. for 17 hours. The methanol and excess ammonia were evaporated under reduced pressure at a bath temperature of about 35° C., leaving a dark-orange, syrupy residue. This syrup was taken up in absolute methanol, the methanol was evaporated at reduced pressure at a bath temperature of about 35° C., and the residue was held under 1.5 mm. pressure for 3 hours at a bath temperature of about 55° C. The residue was dissolved in water, and treated with Darco G–60. The aqueous suspension was filtered, and the filtrate was lyophilized. 1-(2-deoxy-β-D-ribofuranosyl)-4-thio-5-methyluracil was recovered as an extremely hygroscopic, bright yellow solid.

*Part D.—Preparation of 1-(2-Deoxy-β-D-Ribofusanosyl)-5-Methylcytosine (5-Methylcytosine Deoxyriboside)*

A quantity, 856 mg. (2.5 millimoles), of 1-(3,5-di-O-acetyl - 2-deoxy-β-D-ribofuranosyl)-4-thio-5-methyluracil prepared in Part B, contained in a glass liner, was covered with 25 ml. of methanolic ammonia (saturated at 0° C.) and the reaction mixture was heated for 39 hours in a steel bomb at 95 to 105° C. The methanol and excess ammonia were evaporated at a bath temperature of about 40° C. under a presure of about 50 mm. and finally for 2 hours at a pressure of 0.2 mm. The syrupy residue thus obtained was held at about 50 mm. pressure for 24 hours, and was then held at 0.5 mm. pressure at a bath temperature of 55 to 65° C. for 2 hours. A sublimate that collected on the upper walls of the reaction vessel was removed mechanically, and the remaining dark syrup was dissolved in 10 ml. of absolute ethanol. The solution was swirled with Darco G-60, and the flask was stoppered, and held at room temperature for about 12 hours. The mixture was filtered through a bed of Darco G-60 supported on a pad of shredded asbestos, and the filter-cake was washed with absolute ethanol until the filtrate, which was essentially colorless and contained the desired 1-(2-deoxy-β-D-ribofuranosyl)-5-methylcytosine, amounted to about 30 ml.

*Part E.—Preparation of 1-(2-Deoxy-β-D-Ribofuranosyl)-5-Methylcytosine Hydrochloride (5-Methylcytosine Deoxyriboside Hydrochloride)*

Twenty-two ml. of the ethanolic filtrate prepared in Part D was diluted with an equal volume of anhydrous ether. The solution was chilled in an ice-bath while an excess of dry hydrogen chloride was introduced slowly. The white flocculent precipitate which formed immediately redissolved, and was replaced by a white granular precipitate. The walls of the flask were rinsed with a small volume of dry ether, and the flask was stoppered and refrigerated at −20° C. for 10 hours. The precipitate was collected on a filter, washed with anhydrous ether, and dried at reduced pressure over phosphorus pentoxide, yielding 250 mg. of 1-(2-deoxy-β-D-ribofuranosyl)-5-methylcytosine hydrochloride having a melting point of 155 to 156° C. After two recrystallizations from absolute ethanol-anhydrous ether, 1-(2-deoxy-β-D-ribofuranosyl)-5-methylcytosine hydrochloride was obtained as dense snow-white crystals melting at 154.5 to 155° C.

*Analysis.*—Calculated for $C_{10}H_{16}ClN_3O_4$: C, 43.24; H, 5.81; Cl, 12.77; N, 15.13. Found: C, 43.52; H, 6.01; Cl, 12.75; N, 14.44.

Optical rotation: $[\alpha]_D^{24°}$ +58° (c. 0.5185, 0.7537 N NaOH).

Ultraviolet absorption:

$\lambda_{min.}^{0.1\ N\ HCl}$ 245 mμ ($A_M$ 958)

$\lambda_{max.}^{0.1\ N\ HCl}$ 287 mμ ($A_M$ 10,459)

$\lambda_{min.}^{0.1\ N\ NaOH}$ 255 mμ ($A_M$ 4,294)

$\lambda_{max.}^{0.1\ N\ NaOH}$ 278-279 mμ ($A_M$ 7,304)

Characteristic infrared absorption frequencies (cm.$^{-1}$): 3440, 3140, 3000; 2700; 1704, 1685; 1648, 1544; 1116, 1081, 1050, 1025.

$R_f$ 0.30 (81% n-butanol, descending).

*Part F.—Preparation of 1-(2-Deoxy-β-D-Ribofuranosyl)-5-Methylcytosine Picrate*

Eight ml. of the ethanolic filtrate from Part D was diluted with an equal volume of water and then mixed with 20 ml. of a 1.5% (weight:volume) aqueous solution of picric acid. Crystallization began within a short time, and after 7 hours at 0° C., the crystals were separated, washed with cold 50% aqueous ethanol (volume: volume), dried in air, and then dried in an oven at 85° C., to yield 110 mg. of product having a melting point of 174 to 178° C. After two recrystallizations from 95% ethanol, canary yellow, silky needles of 1-(2-deoxy-β-D-ribofuranosyl)-5-methylcytosine picrate melting at 177 to 180° C. were recovered.

*Analysis.*—Calculated for $C_{16}H_{18}N_6O_{11}$: C, 40.85; H, 3.86; N, 17.87. Found: C, 40.96; H, 3.88; N, 17.73.

Characteristic infrared absorption frequencies (cm.$^{-1}$): 3510, 3360, 3090; 1716, 1671; 1614, 1580, 1546, 1505; 1100.

EXAMPLE 3.—PREPARATION OF 1-(2-DEOXY-β-D-RIBOFURANOSYL)-N,5-DIMETHYLCYTOSINE

In a pre-chilled glass liner, enclosed in a steel bomb, a mixture consisting of 856 mg. (2.5 millimoles) of 1-(3,5-di-O-acetyl-2-deoxy-β-D-ribofuranosyl)-4-thio-5-methyluracil (Example 2, Part B) and 25 ml. of absolute methanol previously saturated at 0° C. with anhydrous methylamine was heated for 36 hours at 100 to 110° C. The methanol and excess methylamine were distilled under reduced pressure at a bath temperature of about 40° C. The pale yellow, residual solid was triturated with absolute ethanol, and the solvent was distilled under reduced pressure at a bath temperature of about 40° C. The flesh-colored solid thus obtained was kept under 0.5 mm. pressure for 1.5 hours and at 20 mm. pressure overnight. It was then triturated with a mixture of approximately equal parts (by volume) of absolute methanol and anhydrous ether; and the essentially white solid thus obtained was collected on a filter, washed extensively with the mixed solvent, and dried in an oven at 85° C. Crystallization of 500 mg. of this solid from absolute ethanol gave 375 mg. of fine white crystals of 1-(2-deoxy-β-D-ribofuranosyl)-N,5-dimethylcytosine having a melting point of 227 to 228.5° C. One recrystallization from ethanol yielded 235 mg. of white crystals melting at 229.5 to 231° C.

*Analysis.*—Calculated for $C_{11}H_{17}N_3O_4$: N, 16.46. Found: N, 16.77.

Optical rotation: $[\alpha]_D^{24°}$ +48° (c. 0.8488, N NaOH).

Ultraviolet absorption:

$\lambda_{min.}^{0.1\ N\ NaOH}$ 252-253 mμ ($A_M$ 7,441)

$\lambda_{max.}^{0.1\ N\ NaOH}$ 274-276 mμ ($A_M$ 10,666)

$\lambda_{min.}^{0.1\ N\ HCl}$ 246 mμ ($A_M$ 1,806)

$\lambda_{max.}^{0.1\ N\ HCl}$ 285-286 mμ ($A_M$ 13,620)

Characteristic infrared absorption frequencies (cm.$^{-1}$): 3350, 3260; 1665, 1615, 1565, 1517; 1100, 1090, 1077.

$R_f$ 0.63 (isopropyl alcohol: N HCl (65:35), descending).

Following the procedure of Example 3, but substituting ethylamine, butylamine, isobutylamine, amylamine, octylamine, allylamine, dimethylamine, diethylamine, dipropylamine, diamylamine, diheptylamine, diallylamine, cyclohexylamine, N-methylcyclopentylamine, benzylamine, furfurylamine, N-allylethylamine, 2-aminopyrrole, ethyleneimine, piperidine, morpholine, thiamorpholine, aniline, phenethylamine, 2-methylpyrrolidine, and cyclopentenylamine for methylamine, the corresponding N-substituted 1-(2-deoxy-β-D-ribofuranosyl)-5-methylcytosines are obtained, wherein the respective N-substituents are N-ethyl, N-butyl, N-isobutyl, N-amyl, N-octyl, N-allyl, N, N-dimethyl, N,N-diethyl, N,N-dipropyl, N,N-diamyl, N, N-diheptyl, N,N-diallyl, N-cyclohexyl, N-methyl-N-cyclopentyl, N-benzyl, N-furfuryl, N-allyl-N-ethyl, N-(2-pyrrolyl), N,N-ethylene, N,N-pentamethylene, N,N-(3-oxapentamethylene), N,N-(3-thiapentamethylene), N-phenyl, N-phenethyl, N,N-(1-methyltetramethylene), and N-cyclopentenyl.

EXAMPLE 4.—PREPARATION OF 1-(β-D-RIBOFURANOSYL)-N-METHYLCYTOSINE HYDROCHLORIDE

A mixture of 2.32 g. (6.0 millimoles) of 1-(2,3,5-tri-O-acetyl-β-D-ribofuranosyl)-4-thiouracil (Example 1, Part B), and 70 ml. of methanol which had been saturated at 0° C. with anhydrous methylamine, was heated in a glass liner enclosed in a steel bomb at 105° C. for 72 hours. The reaction mixture was allowed to cool, and the solution was filtered through a cotton plug. The methanol and excess methylamine were distilled under reduced pressure at a bath temperature of about 60° C. The dark residue thus obtained was dissolved in absolute ethanol and distillation at reduced pressure was repeated. The residue was kept under reduced pressure at a bath temperature of about 40° C. for 12 hours. After another distillation with absolute ethanol, the dark residual syrup was held at 0.2 mm. pressure at a bath temperature of 50 to 60° C. for several hours. The dark syrup weighing 2.68 g. was leached with chloroform and the residue, an insoluble gum, was kneaded with anhydrous ether to give a brown semi-solid. The ether was decanted and the semi-solid was dried under reduced pressure. The dry solid weighing 1.52 g. was powdered and washed with absolute ethanol at room temperature. The resulting, nearly white solid was collected on a filter and washed, first with cold absolute ethanol and then with anhydrous ether, to give 1.04 g. of solid material having a melting point of 201 to 204° C. This material was dissolved in about 100 ml. of warm methanol. The solution was stirred with Darco G-60, filtered, and washed with sufficient hot methanol to give a pooled filtrate of approximately 120 ml. The filtrate was cooled in an ice-bath, and an excess of dry hydrogen chloride was introduced. After warming slightly, the solution was diluted slowly with about an equal volume of anhydrous ether. Upon scratching the walls of the flask, crystallization began immediately. The mixture was kept at room temperature for several hours and then refrigerated at 0° C. The crystals were collected on a filter, washed with anhydrous ether, and dried in air. The recovered crystals weighed 1.065 g., and had a melting point of 193 to 196° C. After two further recrystallizations from methanol-anhydrous ether, 945 mg. of 1-($\beta$-D-ribofuranosyl)-N-methylcytosine hydrochloride was recovered having a melting point of 196 to 198° C.

*Analysis.*—Calculated for $C_{10}H_{16}ClN_3O_5$: C, 40.89; H, 5.49; Cl, 12.07; N, 14.31. Found: C, 40.99; H, 5.27; Cl, 12.15; N, 14.71.

Optical rotation: $[\alpha]_D^{23}$ +34° (c. 0.55, $H_2O$).
Ultraviolet absorption:

$\lambda_{min.}^{0.1\ N\ HCl}$ 242–244 m$\mu$ ($A_M$ 2,448)

$\lambda_{max.}^{0.1\ N\ HCl}$ 281 m$\mu$ ($A_M$ 14,230)

$\lambda_{min.}^{0.1\ N\ NaOH}$ 249–250 m$\mu$ ($A_M$ 8,353)

$\lambda_{max.}^{0.1\ N\ NaOH}$ 271–272 m$\mu$ ($A_M$ 11,733)

Characteristic infrared absorption frequencies (cm.$^{-1}$): 3380, 3300, 3240 sh., 3140, 3080, 3040; 2760 sh., 2710, 2560 sh.; 1725, 1655; 1602, 1578, 1514; 1280, 1250, 1196, 1113, 1060, 1026 (sh.=shoulder).

Following the procedure of Example 4, but substituting ethylamine, butylamine, isobutylamine, amylamine, octylamine, allylamine, dimethylamine, diethylamine, dipropylamine, diamylamine, diheptylamine, diallylamine, cyclohexylamine, N-methylcyclopentylamine, benzylamine, furfurylamine, N-allylethylamine, 2-aminopyrrole, ethyleneimine, piperidine, morpholine, thiamorpholine, aniline, phenethylamine, 2-methylpyrrolidine, and cyclopentenylamine for methylamine, the corresponding N-substituted 1-$\beta$-D-ribofuranosylcytosine hydrochlorides are obtained, wherein the respective N-substituents are N-ethyl, N-butyl, N-isobutyl, N-amyl, N-octyl, N-allyl, N,N-dimethyl, N,N-diethyl, N,N-dipropyl, N,N-diamyl, N,N-diheptyl, N,N-diallyl, N-cyclohexyl, N-methyl-N-cyclopentyl, N-benzyl, N-furfuryl, N-allyl-N-ethyl, N-(2-pyrrolyl), N,N-ethylene, N,N-pentamethylene, N,N-(3-oxapentamethylene), N,N-(3-thiapentamethylene), N-phenyl, N-phenethyl, N-(1-methyltetramethylene), and N-cyclopentenyl.

EXAMPLE 5.—PREPARATION OF 1-($\beta$-D-RIBOFURANOSYL)-5-METHYLCYTOSINE

*Part A.—Preparation of 1-(2,3,5-Tri-O-Acetyl-$\beta$-D-Ribofuranosyl)-5-Methyluracil*

A quantity, 2.31 g. (8.94 millimoles), of 1-($\beta$-D-ribofuranosyl)-5-methyluracil was suspended in 25 ml. of acetic anhydride and 1 ml. of pyridine was added. Moisture was excluded from the reaction mixture while the reaction vessel was partially immersed in a bath at about 65° C. and swirled occasionally. After 1.5 hours almost all of the solid had dissolved, forming a pale yellow solution. Heating at a bath temperature of 64 to 70° C. was continued for 4.5 hours, and then the reaction mixture was allowed to cool. After a further 18 hours, the volatile components were removed at about 0.1 mm. pressure and a bath temperature of about 40° C. The syrup that remained was dissolved in absolute ethanol and the solvent was removed at a pressure of about 20 mm., and finally at a pressure of 0.1 mm. This dissolution and evaporation procedure was repeated 3 times and the foamy amorphous solid thus obtained was held at a pressure of about 20 mm. The amorphous solid was then dissolved in chloroform and the solution was washed twice with ice-water, twice with cold 3 N sulfuric acid, twice with cold saturated sodium bicarbonate solution, twice with ice-water, and then dried over anhydrous sodium sulfate. The chloroform was then distilled under reduced pressure at a bath temperature of about 50° C.; the residue was taken up in methanol, and the methanol was evaporated. The resulting product was dissolved in absolute ethanol which was removed by gentle heating under reduced pressure and the resulting white, amorphous solid was held for 2 hours at a bath temperature of about 40° C. at 0.01 mm. pressure, yielding 3.29 g. of 1-(2,3,5-tri-O-acetyl-$\beta$-D-ribofuranosyl)-5-methyluracil.

*Part B.—Preparation of 1-(2,3,5-Tri-O-Acetyl-$\beta$-D-Ribofuranosyl)-4-Thio-5-Methyluracil*

A quantity, 384 mg. (1.0 millimole) of 1-(2,3,5-tri-O-acetyl-$\beta$-D-ribofuranosyl)-5-methyluracil (Part A) and 248 mg. (1.12 millimoles) of phosphorus pentasulfide were mixed in the presence of 6 ml. of pyridine. While moisture was excluded, the reaction mixture was gently refluxed for 2.5 hours. The orange-colored supernatant solution which appeared over a small amount of dark insoluble syrup was then separated and added to a mixture of ice and water. The dark insoluble syrup was washed with pyridine and the washings also were added to the mixture of ice and water. After standing for about 1.5 hours, 125 mg. of nearly white solid was separated by filtration and discarded, and the filtrate, which was pale yellow, was chilled, and acidified with 10 ml. of cold 12 N sulfuric acid. A pale yellow precipitate separated and was collected on a filter, washed with water, and dissolved in chloroform. This chloroform solution was washed 3 times with ice-water, twice with ice-cold saturated sodium bicarbonate solution, twice again with ice-water, and dried over anhydrous sodium sulfate. The chloroform was then distilled under reduced pressure at a bath temperature of about 40° C. and the residue was taken up in absolute methanol. The methanol was distilled as above and all traces were eliminated by reducing the pressure to about 0.1 mm. Solution in methanol and distillation was again repeated with the residue being held under 0.1 mm. pressure at a bath temperature of about 35° C. for 4.5 hours. The residue was stored at 20 mm. pressure overnight. The yield of 1-(2,3,5-tri-O-acetyl-$\beta$-D-ribofuranosyl)-4-thio-5-methyluracil was 205 mg.

Ultraviolet absorption:

$\lambda_{max.}^{95\%\ EtOH}$ 242–246 m$\mu$ ($A_M$ 4,514)

$\lambda_{min.}^{95\%\ EtOH}$ 272–276 m$\mu$ ($A_M$ 2,912)

$\lambda_{max.}^{95\%\ EtOH}$ 330–332 m$\mu$ ($A_M$ 17,763)

Characteristic infrared absorption frequencies (cm.$^{-1}$): 3230, 3080; 1765, 1702; 1630; 1228; 1090, 1042.

*Part C.—Preparation of 1-($\beta$-D-Ribofuranosyl)-5-Methylcytosine Hydrochloride*

A quantity, 601 mg. (1.5 millimoles), of 1-(2,3,5-tri-O-acetyl-$\beta$-D-ribofuranosyl)-4-thio-methyluracil (Part B) was heated with 30 ml. of methanol (saturated with ammonia at 0° C.) in a glass liner enclosed in a steel bomb at a temperature of 100 to 105° C. for 37 hours. The reaction mixture was then cooled and transferred to a round-bottom flask with methanol. The methanol and excess ammonia were then removed under reduced pressure at a bath temperature of about 40° C. and the residue was swirled with hot absolute ethanol. The ethanol was then removed under reduced pressure at a temperature of about 40° C., and the residue was held at 20 mm. pressure at a bath temperature of 40 to 45° C. for 60 hours. The straw-colored residue was dissolved in hot absolute ethanol and decolorized with Darco G–60. The mixture was filtered, and the filter-cake was washed with hot absolute ethanol. The combined filtrate (about 30 ml.) which was now nearly colorless was diluted to near turbidity with 40 ml. of anhydrous ether. While cooling in an ice-bath, dry hydrogen chloride was bubbled into the solution. The initial turbidity cleared and upon scratching the walls of the vessel a white crystalline solid began to deposit. After refrigeration at −20° C., the white crystalline solid was collected on a filter, washed with anhydrous ether, and dried at 85° C. There was thus obtained 240 mg. of 1-(β-D-ribofuranosyl)-5-methylcytosine hydrochloride having a melting point of 177 to 180° C. Two recrystallizations from absolute methanol-anhydrous ether gave snow-white crystals melting at 177 to 178.5° C.

*Analysis.*—Calculated for $C_{10}C_{18}ClN_3O_5$: C, 40.89; H, 5.49; Cl, 12.07; N, 14.30. Found: C, 40.81; H, 5.23; Cl, 12.30; N, 14.48.

Optical rotation: $[\alpha]_D^{24°}$ +24° (c. 0.525, $H_2O$).

Ultraviolet absorption:

$\lambda_{min.}^{0.1\,N\,NaOH}$ 256 m$\mu$ ($A_M$ 4,901)

$\lambda_{max.}^{0.1\,N\,NaOH}$ 278–280 m$\mu$ ($A_M$ 8,281)

$\lambda_{min.}^{0.1\,N\,HCl}$ 245 m$\mu$ ($A_M$ 786)

$\lambda_{max.}^{0.1\,N\,HCl}$ 287–288 m$\mu$ ($A_M$ 12,149)

EXAMPLE 6.—PREPARATION OF 1-(β-D-RIBOFURANOSYL)-N,5-DIMETHYLCYTOSINE HYDROCHLORIDE

A mixture of 300 mg. (0.75 millimole) of 1-(2,3,5-tri-O-acetyl-β-D-ribofuranosyl)-4-thio-5-methyluracil (Example 5, Part B) and 15 ml. of absolute methanol previously saturated at 0° C. with anhydrous methylamine was heated in a glass liner enclosed in a steel bomb at 105° C. for 37 hours. The methanol and excess methylamine were removed under reduced pressure at a bath temperature of about 40° C., leaving an oily residue. This residue was taken up in absolute ethanol and the ethanol was evaporated at reduced pressure at about 40° C. This procedure of dissolving in absolute ethanol and evaporation was repeated two additional times. The residue thus obtained was kept under 2 mm. pressure for 2 hours at a bath temperature of about 40° C., followed by an additional interval of 1.25 hours at 0.2 mm. pressure. The residue (355 mg.) was then dissolved in absolute ethanol. The solution was swirled intermittently with Darco G–60, filtered, and the filter-cake was washed with sufficient absolute ethanol to give a combined filtrate of 20 ml. The filtrate, which was now nearly colorless, was diluted with an equal volume of anhydrous ether and the faintly cloudy solution produced thereby was cooled in an ice-bath and treated with an excess of dry hydrogen chloride. The reaction mixture became cloudy immediately, then cleared, followed by precipitation of a white solid. After refrigeration at −20° C., the white solid was collected on a filter, washed with anhydrous ether, and dried in an oven at 85° C. to yield 200 mg. of 1-(β-D-ribofuranosyl)-N,5-dimethylcytosine hydrochloride having a melting point of 206 to 209° C. Two recrystallizations from absolute methanol-anhydrous ether gave a pure product melting at 204 to 206° C.

*Analysis.*—Calculated for $C_{11}H_{18}ClN_3O_5$: C, 42.93; H, 5.90; Cl, 11.52; N, 13.65. Found: C, 42.75; H, 5.81; Cl, 11.30; N, 13.15.

Optical rotation: $[\alpha]_D^{24°}$ +25° (c. 0.530, $H_2O$).

Ultraviolet absorption:

$\lambda_{min.}^{0.1\,N\,NaOH}$ 253–254 m$\mu$ ($A_M$ 7,377)

$\lambda_{max.}^{0.1\,N\,NaOH}$ 276 m$\mu$ ($A_M$ 10,598)

$\lambda_{min.}^{0.1\,N\,HCl}$ 246 m$\mu$ ($A_M$ 1,755)

$\lambda_{max.}^{0.1\,N\,NaOH}$ 285–286 m$\mu$ ($A_M$ 13,552)

Following the procedure of Example 6, but substituting ethylamine, butylamine, isobutylamine, amylamine, octylamine, allylamine, dimethylamine, diethylamine, dipropylamine, diamylamine, diheptylamine, diallylamine, cyclohexylamine, N-methylcyclopentylamine, benzylamine, furfurylamine, N-allylethylamine, 2-aminopyrrole, ethyleneimine, piperidine, morpholine, thiamorpholine, aniline, phenethylamine, 2-methylpyrrolidine, and cyclopentenylamine for methylamine, the corresponding N-substituted 1-(β-D-ribofuranosyl)-5-methylcytosine hydrochlorides are obtained, wherein the respective N-substituents are N-ethyl, N-butyl, N-isobutyl, N-amyl, N-octyl, N-allyl, N,N-dimethyl, N,N-diethyl, N,N-dipropyl, N,N-diamyl, N,N-diheptyl, N,N-diallyl, N-cyclohexyl, N-methyl-N-cyclopentyl, N-benzyl, N-furfuryl, N-allyl-N-ethyl, N-(2-pyrrolyl), N,N-ethylene, N,N-pentamethylene, N,N-(3-oxapentamethylene), N,N-(3-thiapentamethylene), N-phenyl, N-phenethyl, N,N-(1-methyltetramethylene), and N-cyclopentenyl.

EXAMPLE 7.—PREPARATION OF 1-(β-D-RIBOFURANOSYL)-5-ETHYLCYTOSINE

*Part A.—Preparation of 1-(2,3,5-Tri-O-Acetyl-β-D-Ribofuranosyl)-5-Ethyluracil*

A suspension of 1.5 g. (5.52 millimoles) of 1-(β-D-ribofuranosyl)-5-ethyluracil in 20 ml. of acetic anhydride and 1 ml. of pyridine was heated in a bath at 63° C. with exclusion of moisture. The reaction mixture was swirled intermittently during the first 35 minutes while the bath temperature ranged from 63 to 67° C. Solution was completed within about 30 minutes. The yellowish solution which resulted was heated for an additional 4.5 hours at a bath temperature of 66 to 70° C. The reaction mixture was then cooled and allowed to stand at room temperature for about 12 hours. The volatile components were removed at a pressure of 0.2 mm. and a bath temperature of about 40° C. The residual glass was dissolved in absolute methanol and the methanol was then evaporated at a pressure of 20 mm. and a bath temperature of about 40° C. The last traces of methanol were removed at a pressure of 0.2 mm. After repeating this procedure two times, a straw colored, amorphous, somewhat gummy resdue weighing 2.25 g. was obtained. This residue was dissolved in chloroform and the solution was washed twice with ice-water, twice with cold 3 N sulfuric acid, twice with cold, saturated sodium bicarbonate solution, and twice with ice-water. The chloroform solution was then swirled occasionally during 2 hours with Darco G–60, filtered, the filter-cake was washed well with chloroform, and the filtrate, now nearly colorless, was dried over anhydrous sodium sulfate. The chloroform was then removed under 50 mm. pressure at a bath temperature of about 45° C., leaving a foamy solid residue which was dissolved in warm absolute ethanol. The ethanol was removed at a pressure of 50 mm. at a bath temperature of about 45° C., leaving a semi-solid residue which was kept at 0.2 mm. pressure for 2 hours at a bath temperature of about 50° C.

There was thus obtained 2.13 g. of 1-(2,3,5-tri-O-acetyl-β-D-ribofuranosyl)-5-ethyluracil as a straw-colored, slightly gummy glass.

*Part B.—Preparation of 1-(2,3,5-Tri-O-Acetyl-β-D-Ribofuranosyl)-4-Thio-5-Ethyluracil*

A mixture consisting of 199 mg. (0.5 millimole) of 1-(2,3,5-tri-O-acetyl-β-D-ribofuranosyl)-5-ethyluracil (Part A) and 124 mg. (0.557 millimole) of phosphorus pentasulfide in 3 ml. of pyridine was gently refluxed for 2.25 hours. The reaction mixture separated into two phases. The supernatant solution, a dark, organge-yellow liquid, was transferred into a mixture of ice and water. The residue, a dark, insoluble syrup, was washed three times with pyridine and the washings were added to the ice mixture. A flocculent precipitate soon appeared, and the ice-water mixture was refrigerated at 0° C. overnight. It was then filtered, and the filter containing the precipitate was washed with ice-water. The combined filtrate was chilled and acidified with 10 ml. of cold, 12 N sulfuric acid and refrigerated at 0° C. until a pale yellow precipitate separated. The precipitate was collected on a filter, washed with water, and dissolved in chloroform.

The chloroform solution was washed twice with ice-water, twice with ice-cold 3 N sulfuric acid, twice with ice-cold saturated sodium bicarbonate solution, and twice with ice-water. After drying the chloroform solution over anhydrous sodium sulfate, the chloroform was evaporated at a pressure of 20 mm. at a bath temperature of about 40° C. to a yellowish glass which was dissolved in absolute methanol. The methanol was then evaporated at a pressure of 20 mm. at about 40° C., yielding 1-(2,3,5-tri-O-acetyl-β-D-ribofuranosyl)-4-thio-5-ethyluracil as a yellowish amorphous solid.

Ultraviolet absorption:

$\lambda_{max.}^{95\% \text{ EtOH}}$ 246 m$\mu$ (A$_M$ 3,594)

$\lambda_{min.}^{95\% \text{ EtOH}}$ 282–283 m$\mu$ (A$_M$ 2,040)

$\lambda_{max.}^{95\% \text{ EtOH}}$ 330–333 m$\mu$ (A$_M$ 13,987)

Characteristic infrared absorption frequencies (cm.$^{-1}$): 3280, 3200; 1742, 1702, 1685; 1630; 1205; 1092, 1045.

*Part C.—Preparation of 1-(β-D-Ribofuranosyl)-5-Ethylcytosine Hydrochloride*

A quantity, 332 mg. (0.8 millimole), of 1-(2,3,5-tri-O-acetyl-β-D-ribofuranosyl)-4-thio-5-ethyluracil (Part B) was covered with 15 ml. of saturated methanolic ammonia. The mixture was heated in a glass liner enclosed in a steel bomb at approximately 105° C. for 39 hours and then cooled. The reaction mixture, orange-colored, was transferred to a round-bottom flask with methanol, and the methanol and excess ammonia were evaporated under reduced pressure at a bath temperature of about 40° C. to a syrupy residue which was dissolved in absolute ethanol. The ethanol was distilled under reduced pressure at a bath temperature of about 40° C. This solution and distillation step was repeated and the residue was held under 0.2 mm. pressure for 7 hours at a bath temperature of about 40° C., and then held overnight under 20 mm. pressure at a bath temperature of about 40° C. The residue, a thick syrup, weight 310 mg., was dissolved in absolute ethanol, the solution was swirled intermittently with Darco G-60, and allowed to stand at room temperature for about 12 hours. The susupension was filtered, and the filter-cake was washed with sufficient volume of absolute ethanol to give a filtrate volume of approximately 20 ml. The filtrate was diluted with an equal volume of anhydrous ether and chilled in an ice-bath while an excess of dry hydrogen chloride was introduced. The solution was then diluted to turbidity with 50 ml. of anhydrous ether and refrigerated at −20° C. After about 12 hours, the mixture was further diluted with dry ether and filtered. After washing the resulting solid with dry ether and drying in an oven at 85° C., there was obtained 110 mg. of 1-(β-D-ribofuranosyl)-5-ethylcytosine hydrochloride having a melting point of 167 to 172° C. After two recrystallizations from absolute ethanol-anhydrous ether, white, burr-like crystals melting at 173 to 175° C. were obtained.

*Analysis.*—Calculated for C$_{11}$H$_{18}$ClN$_3$O$_5$: C, 42.93; H, 5.90; Cl, 11.52; N, 13.65. Found: C, 42.95; H, 5.49; Cl, 10.38; N, 14.11.

Optical rotation: [α]$_D^{24°}$ +18 (c. 0.55235, H$_2$O).

EXAMPLE 8.—PREPARATION OF 1-(β-D-RIBOFURANOSYL)-N-METHYL-5-ETHYLCYTOSINE HYDROCHLORIDE

Twenty ml. of saturated methanolic methylamine was added to 620 mg. of 1-(2,3,5-tri-O-acetyl-β-D-ribofuranosyl)-4-thio-5-ethyluracil (Example 7, Part B) contained in a glass liner, and the mixture was heated at 100 to 105° C. in a steel bomb for approximately 40 hours. After cooling, the reaction mixture was transferred to a round-bottom flask with methanol. The methanol and excess methylamine were evaporated under 20 mm. pressure at a bath temperature of about 40° C., and finally under 0.2 mm. pressure. The residue was taken up in absolute ethanol and the ethanol was distilled at 20 mm. pressure at a temperature of about 40° C. This solution and distillation step was repeated twice, leaving a yellowish residual gum which was triturated thoroughly and repeatedly with chloroform. The chloroform was decanted, and the residue was held under 20 mm. pressure to remove volatile solvents. The yellowish gum thus obtained, 555 mg., was dissolved in absolute ethanol, the solution was swirled intermittently with Darco G-60, and allowed to stand at room temperature overnight. The suspension was filtered, and the filter-cake was washed with sufficient absolute ethanol to give a combined filtrate of 20 ml. The filtrate was diluted with an equal volume of anhydrous ether and while chilled in an ice-bath was treated with an excess of anhydrous hydrogen chloride. After dilution with 30 ml. of anhydrous ether, the turbid solution was refrigerated at −20° C. and the cold solution was poured into 200 ml. of anhydrous ether. A flocculent precipitate was deposited immediately. After refrigerating the mixture at 0° C., the precipitate was collected on a filter, washed with anhydrous ether, and stored under reduced pressure over phosphorous pentoxide. There was thus obtained 230 mg. of 1-(β-D-ribofuranosyl)-N-methyl-5-ethylcytosine hydrochloride having a melting point of about 154 to 159° C. (with softening) and the following ultraviolet absorption:

$\lambda_{min.}^{0.1 \text{ N HCl}}$ 245–246 m$\mu$ $\lambda_{max.}^{0.1 \text{ N HCl}}$ 284 m$\mu$ Following the procedure of the above example but substituting ethylamine, butylamine, isobutylamine, amylamine, octylamine, allylamine, dimethylamine, diethylamine, dipropylamine, diamylamine, diheptylamine, diallylamine, cyclohexylamine, N-methylcyclopentylamine, benzylamine, furfurylamine, N-allylethylamine, 2-aminopyrrole, ethyleneimine, piperidine, morpholine, thiamorpholine, aniline, phenethylamine, 2-methylpyrrolidine, and cyclopentenylamine for methylamine, the corresponding N-substituted 1-(β-D-ribofuranosyl)-5-ethylcytosine hydrochlorides are obtained, wherein the respective N-substituents are N-ethyl, N-butyl, N-isobutyl, N-amyl, N-octyl, N-allyl, N,N-dimethyl, N,N-diethyl, N,N-dipropyl, N,N-diamyl, N,N-diheptyl, N,N-diallyl, N-cyclohexyl, N-methyl-N-cyclopentyl, N-benzyl, N-furfuryl, N-allyl-N-ethyl, N-(2-pyrrolyl), N,N-ethylene, N,N-pentamethylene, N,N-(3-oxapentamethylene), N,N-(3-thiapentamethylene), N-phenyl, N-phenethyl, N,N-(1-methyltetramethylene), and N-cyclopentenyl.

EXAMPLE 9.—PREPARATION OF 1-β-D-GLUCOPYRANOSYL-5-METHYLCYTOSINE

*Part A.—Preparation of 1-(2,3,4,6-Tetra-O-Acetyl-β-D-Glucopyranosyl)-4-Thio-5-Methyluracil*

Thirty ml. of pyridine was added to a mixture of 2.28 g. (5.0 millimoles) of 1-(2,3,4,6-tetra-O-acetyl-β-D-glucopyranosyl)-5-methyluracil and 1.0 g. (4.5 millimoles) of phosphorus pentasulfide. With exclusion of moisture, the mixture was brought to gentle boiling under reflux. Reaction began rather vigorously with the development of an orange-colored, homogeneous solution. During a 4.5 hour period of reflux, a small amount of a dark, insoluble syrup separated. The hot solution was decanted from the dark syrup into a mixture of about 50 g. of crushed ice and 100 ml. of water. A bright yellow gum separated. The mixture was refrigerated at 0° C., the supernatant solution was decanted, and the gummy residue was dissolved in chloroform. The citron-yellow chloroform solution was washed twice with ice-water, twice with ice-cold 3 N sulfuric acid, twice with ice-cold saturated sodium bicarbonate solution, twice with ice-water, and the chloroform solution was then dried over anhydrous sodium sulfate. The solvent was removed under reduced pressure and a bath temperature of about 50° C. The residue was dissolved in absolute methanol, and the methanol was removed at reduced pressure, to give 1.46 g. of 1-(2,3,4,6-tetra-O-acetyl-β-D-glucopyranosyl)-4-thio-5-methyluracil as a bright yellow foamy glass having the following ultraviolet absorption:

$\lambda_{max.}^{95\% \text{ EtOH}}$ 239–244 mμ ($A_M$ 4,044)

$\lambda_{min.}^{95\% \text{ EtOH}}$ 273–275 mμ ($A_M$ 2,763)

$\lambda_{max.}^{95\% \text{ EtOH}}$ 329 mμ ($A_M$ 18,739)

Characteristic infrared absorption frequencies (cm.$^{-1}$): 3250; 1745; 1700; 1632; 1225.

*Part B.—Preparation of 1-(β-D-Glucopyranosyl)-4-Thio-5-Methyluracil*

Thirty ml. of absolute methanol which had been saturated previously with anhydrous ammonia at 0° C. was added to 1.18 g. (2.5 millimoles) of 1-(2,3,4,6-tetra-O-acetyl-β-D-glycopyranosyl)-4-thio-5-methyluracil (Part A). The reaction mixture was stoppered securely, swirled momentarily to complete solution and stored at 0° C. for about 24 hours. The methanol and excess ammonia were removed from the reaction mixture under reduced pressure at a bath temperature of about 40° C. When essentially all the solvent had been removed, the residue was held under reduced pressure at a bath temperature of approximately 40° C. for 19 hours. The residue was held under 0.1 mm. pressure at a bath temperature of about 50° C. for an additional 5 hours; 1-(β-D-glucopyranosyl)-4-thio-5-methyluracil was thus recovered as a golden-yellow glass.

Ultraviolet absorption:

$\lambda_{max.}^{95\% \text{ EtOH}}$ 243–246 mμ ($A_M$ 2,690)

$\lambda_{min.}^{95\% \text{ EtOH}}$ 278–282 mμ ($A_M$ 1,812)

$\lambda_{max.}^{95\% \text{ EtOH}}$ 331–333 mμ ($A_M$ 12,448)

Characteristic infrared absorption frequencies (cm.$^{-1}$): 3340; 1700, 1658; 1632; 1085, 1045.

$R_f$ 0.42 (81% n-butanol, descending).

*Part C.—Preparation of 1-(β-D-Glucopyranosyl)-5-Methylcytosine*

I. FROM 1-(2,3,4,6-TETRA-O-ACETYL-β-D-GLUCOPYRANOSYL)-4-THIO-5-METHYLURACIL

In a chilled glass liner, 472 mg. (1.0 millimole) of 1-(2,3,4,6-tetra-O-acetyl-β-D-glucopyranosyl)-4-thio-5-methyluracil (Part A) was covered with 5 ml. of absolute methanol which had been saturated previously at 0° C. with anhydrous ammonia. The liner was closed and heated in a steel bomb at 100 to 105° C. for approximately 30 hours. After cooling, the faintly cloudy, yellow contents were transferred to a round-bottom flask with methanol, and the methanol and excess ammonia were removed under reduced pressure at a bath temperature of about 45° C. After triturating the residue with methanol, and removing the solvent under diminished pressure, there was obtained 510 mg. of 1-(β-D-glucopyranosyl)-5-methylcytosine as a nearly white solid having a melting point of 275 to 280° C.

Ultraviolet absorption:

$\lambda_{min.}^{0.1 \text{ N NaOH}}$ 256–257 mμ ($A_M$ 5,932)

$\lambda_{max.}^{0.1 \text{ N NaOH}}$ 275–276 mμ ($A_M$ 7,914)

$\lambda_{min.}^{0.1 \text{ N HCl}}$ 244–245 mμ ($A_M$ 1,578)

$\lambda_{max.}^{0.1 \text{ N HCl}}$ 284 mμ ($A_M$ 11,432)

Characteristic infrared absorption frequencies (cm.$^{-1}$): 3440, 3370, 3160; 1674, 1660, 1604, 1536, 1504; 1129, 1092, 1047.

$R_f$ 0.06 (81% n-butanol, descending).

II. FROM 1-(β-D-GLUCOPYRANOSYL)-4-THIO-5-METHYLURACIL

Following the procedure described in Example C(I), 480 mg. (1.577 millimoles) of 1-(β-D-glucopyranosyl)-4-thio-5-methyluracil (Part B) was heated with 25 ml. of absolute methanolic ammonia for approximately 40 hours at about 105° C. After working up as directed under (I), 270 mg. of 1-(β-D-glucopyranosyl)-5-methylcytosine was obtained as a nearly white solid; melting point, 285 to 287° C.

Ultraviolet absorption:

$\lambda_{min.}^{0.1 \text{ N NaOH}}$ 257 mμ ($A_M$ 5,781)

$\lambda_{max.}^{0.1 \text{ N NaOH}}$ 275–276 mμ ($A_M$ 7,794)

$\lambda_{min.}^{0.1 \text{ N HCl}}$ 244 mμ ($A_M$ 1,628)

$\lambda_{max.}^{0.1 \text{ N HCl}}$ 284–285 mμ ($A_M$ 11,490)

$R_f$ 0.06 (81% n-butanol, descending).

Following the procedure described in Part C(I) but substituting 1-(β-D-glucopyranosyl)-4-thio-5-methyluracil for 1-(2,3,4,6-tetra-O-acetyl-β-D-glucopyranosyl) - 4 - thio-5-methyluracil and substituting methylamine, ethylamine, butylamine, isobutylamine, amylamine, octylamine, allylamine, dimethylamine, diethylamine, dipropylamine, diamylamine, diheptylamine, diallylamine, cyclohexylamine, N-methylcyclopentylamine, benzylamine, furfurylamine, N-allylethylamine, 2-aminopyrrole, ethyleneimine, piperidine, morpholine, thiamorpholine, aniline, phenethylamine, 2-methylpyrrolidine, and cyclopentenylamine for ammonia, the corresponding N-substituted 1-(β-D-glucopyranosyl)-5-methyl-cytosines are obtained, wherein the respective N-substituents are N-methyl, N-ethyl, N-butyl, N-isobutyl, N-amyl, N-octyl, N-allyl, N,N-dimethyl, N,N-diethyl, N,N-dipropyl, N,N-diamyl, N,N-diheptyl, N,N-diallyl, N-cyclohexyl, N-methyl-N-cyclopentyl, N-benzyl, N-furfuryl, N-allyl-N-ethyl, N-(2-pyrrolyl), N,N-ethylene, N,N-pentamethylene, N,N-(3-oxapentamethylene), N,N-(3-thiapentamethylene), N-phenyl, N-phenethyl, N,N-(1-methyltetramethylene), and N-cyclopentenyl.

EXAMPLE 10.—PREPARATION OF 1-(β-D-GLUCOPYRANOSYL)-N,5-DIMETHYLCYTOSINE

Seven hundred and eight mg. (1.5 millimoles) of 1-(2,3,4,6-tetra-O-acetyl-β-D-glucopyranosyl)-4-thio-5-methyluracil (Example 9, Part A) in a chilled glass liner was mixed with a solution of absolute methanol saturated with anhydrous methylamine at 0° C. The liner was closed and heated in a steel bomb at 100 to 105° C. for approximately 30 hours. After cooling, the reaction mixture was transferred to a round-bottom flask with methanol, and the methanol and excess methylamine were distilled under reduced pressure at a bath temperature of about 45° C. to yield a light-yellow residual syrup. This syrup was dissolved in absolute ethanol and the solvent was removed under reduced pressure, this procedure being repeated twice. The yellowish residual solid thus obtained was held under 0.2 mm. pressure for 1.25 hours at a bath temperature of about 55° C. and then kept under reduced pressure overnight. The material thus obtained (705 mg.) was triturated with cold, absolute ethanol; the product was collected on a filter, and the filter-cake was washed repeatedly with absolute ethanol, and dried at 0.2 mm. pressure over phosphorus pentoxide for about 12 hours. There was thus obtained 405 mg. of 1-(β-D-glucopyranosyl)-N,5-dimethylcytosine as a nearly white solid having a melting point of 283 to 287° C. (decomposition) with softening at about 281° C.

*Analysis.*—Calculated for $C_{12}H_{19}N_3O_6$: C, 47.84; H, 6.36; N, 13.95. Found: C, 47.81; H, 6.32; N, 13.66.

Ultraviolet absorption:

$\lambda_{min.}^{0.1 \text{ N NaOH}}$ 252–253 mμ ($A_M$ 8,002)

$\lambda_{max.}^{0.1 \text{ N NaOH}}$ 272 mμ ($A_M$ 9,823)

$\lambda_{min.}^{0.1 \text{ N HCl}}$ 245 mμ ($A_M$ 2,249)

$\lambda_{max.}^{0.1 \text{ N HCl}}$ 282–284 mμ ($A_M$ 12,412)

Characteristic infrared absorption frequencies (cm.$^{-1}$): 3330, 3120; 1665, 1615, 1565, 1515, 1125; 1095, 1076; 1055, 1005.

$R_f$ 0.16 (81% n-butanol, descending).

EXAMPLE 11.—PREPARATION OF 1-(β-D-GLUCOPYRANOSYL)-N,N,5-TRIMETHYLCYTOSINE

An excess of anhydrous dimethylamine was introduced into absolute methanol at 0° C. To 708 mg. (1.5 millimoles) of 1-(2,3,4,6-tetra-O-acetyl-β-D-glucopyranosyl)-

4-thio-5-methyluracil (Example 9, Part A) in a cold glass liner, 25 ml. of the cold dimethylamine solution was added. The mixture was heated in a steel bomb for 39 hours at 105° C. The methanol and excess dimethylamine were removed under reduced pressure at a bath temperature of about 45° C. The straw-colored residual syrup was dissolved in absolute ethanol, the solvent was removed, and the residue was held under reduced pressure overnight at a bath temperature of about 40° C. The yield of crude semi-solid 1-(β-D-glucopyranosyl)-N,N,5-trimethylcytosine was 750 mg.

A small amount of the crude material, upon trituration with a mixture of chloroform and anhydrous ether, gave a white solid. The solvent mixture was decanted, and the residual solid dried under reduced pressure. In 0.1 N hydrochloric acid this material had a qualitative ultraviolet absorption spectrum as follows:

$\lambda_{min.}$ 243–244 m$\mu$; $\lambda_{max.}$ 280–281 m$\mu$

The remainder of the crude semi-solid material was triturated with a mixture of chloroform and anhydrous ether, washed repeatedly with this mixed solvent, and stored in a desiccator over phosphorus pentoxide. There was thus obtained 490 mg. of 1-(β-D-glucopyranosyl)-N,N,5-trimethylcytosine as a pale yellow solid.

EXAMPLE 12.—PREPARATION OF 1-(β-D-GLUCOPYRANOSYL)-N-BENZYL-5-METHYLCYTOSINE AND HYDROCHLORIDE THEREOF

A mixture of 680 mg. (1.44 millimoles) of 1-(2,3,4,6-tetra-O-acetyl-β-D-glucopyranosyl)-4-thio-5-methyluracil (Example 9, Part A) and 3.0 ml. of benzylamine was heated gently under reflux for 2.5 hours. The reaction mixture was then chilled to −20° C. and stirred with anhydrous ether. The crude solid was collected on a filter, triturated with anhydrous ether, collected on a filter and dried in an oven at 85° C. There was thus obtained 480 mg. of 1-(β-D-glucopyranosyl)-N-benzyl-5-methylcytosine melting at about 115 to 125° C. and having the following ultraviolet absorption:

$\lambda_{min.}^{0.1\ N\ HCl}$ 248–249 m$\mu$ (A$_M$ 2,362)

$\lambda_{max.}^{0.1\ N\ HCl}$ 287–289 m$\mu$ (A$_M$ 11,350)

A solution of 1-(β-D-glucopyranosyl)-N-benzyl-5-methylcytosine in absolute ethanol was treated with anhydrous hydrogen chloride. On addition of dry ether, 1-(β-D-glucopyranosyl)-N-benzyl-5-methylcytosine hydrochloride was obtained as an amorphous, white extremely hygroscopic solid.

EXAMPLE 13.—PREPARATION OF 1-(β-D-XYLOFURANOSYL)-5-METHYLCYTOSINE

*Part A.—Preparation of 1-(2,3,5-Tri-O-Benzoyl-β-D-Xylofuranosyl)-5-Methyluracil*

A suspension of 9.35 g. (0.020 mole) of dithyminyl mercury in 450 ml. of anhydrous xylene was stirred mechanically and dried by azeotropically distilling 150 ml. of solvent. The residual suspension was cooled slightly and mixed with 150 ml. of dry xylene containing 18.5 g. of 2,3,5-tri-O-benzoyl-D-xylofuranosyl chloride. The mixture was stirred and heated under reflux for 4 hours, filtered, and the filter-cake was washed repeatedly with boiling xylene. The combined filtrates were diluted slowly with 2.5 liters of petroleum ether and the mixture was refrigerated. A light, flocculent precipitate which deposited was collected on a filter, washed with cold petroleum ether, and dissolved in chloroform. The chloroform solution was filtered from a small amount of chloroform-insoluble material and the filter-cake was washed thoroughly with chloroform. The filtrate was washed three times with 30% aqueous potassium iodide solution, twice with water, and dried over anhydrous sodium sulfate. The solvent was removed under reduced pressure at a bath temperature of about 50° C. and the residue was held at 20 mm. pressure for 15 hours.

An amorphous solid weighing 11.43 g., having a melting point of about 85 to 95° C., was recovered. Four g. of the solid was triturated thoroughly with 20 ml. of anhydrous methanol and the nearly colorless supernatent was decanted, leaving a thin, syrupy, insoluble residue which was triturated with 5 ml. of anhydrous methonal. The supernatant was removed, leaving syrup which upon standing at room temperature for about 2 hours set to a waxy solid. After the solid was triturated repeatedly with small volumes of absolute methanol, collected on a filter, washed with absolute methanol, and dried in air, there was obtained about 2 g. of waxy solid melting at 180 to 184° C. This solid was dissolved in 50 ml. of hot acetone. The solution was treated with Darco G-60, filtered the filter-cake was washed with 10 ml. of hot acetone, and the combined filtrate was diluted slowly with 20 ml. of water. The cloudy solution thus obtained was allowed to cool; it was then inoculated with a seed crystal and refrigerated at 0° C. After scratching and continued refrigeration, a white crystalline material was collected on a filter, washed with cold aqueous acetone (1:5, by volume) and air-dried. After recrystallization from aqueous acetone (1:9, by volume), there were obtained white crystals of 1-(2,3,5-tri-O-benzoyl-β-D-xylofuranosyl)-5-methyluracil which melted at 195 to 197° C.

*Analysis.*—Calculated for $C_{31}H_{26}N_2O_9$: C, 65.26; H, 4.59; N, 4.91. Found: C, 65.64; H, 5.01; N, 4.65.

Optical rotation: $[\alpha]_D^{24°}$ +56° (c. 0.807, chloroform).

Ultraviolet absorption:

$\lambda_{max.}^{CHCl_3}$ 267 m$\mu$ (A$_M$ 10,395)

*Part B.—Preparation of 1-(2,3,5-Tri-O-Benzoyl-β-D-Xylofuranosyl)-4-Thio-5-Methyluracil*

A mixture of 2.85 g. (5.0 millimoles) of 1-(2,3,5-tri-O-benzoyl-β-D-xylofuranosyl)-5-methyluracil (Part A), 1.24 g. (5.57 millimoles) of phosphorus pentasulfide, and 30 ml. of pyridine was heated under gentle reflux for 4 hours, with exclusion of external moisture. The upper layer was decanted from a small amount of an insoluble syrup into a mixture of about 50 g. of crushed ice and 100 ml. of water. The insoluble syrup was washed twice with pyridine and the washings were added to the ice-water mixture. From the latter, after stirring and chilling at 0° C., a finely divided precipitate was collected on a filter, washed with water, and dissolved in chloroform. The chloroform solution was washed with ice-water, cold 3 N sulfuric acid, cold, saturated sodium bicarbonate solution, and ice-water. The washed chloroform solution was dried over anhydrous sodium sulfate. The solvent was removed under reduced pressure at a bath temperature of about 45° C., yielding 2.79 g. of 1-(2,3,5-tri-O-benzoyl-β-D-xylofuranosyl)-4-thio-5-methyluracil as a pale yellow amorphous solid having the following ultraviolet absorption:

$\lambda_{max.}^{95\%\ EtOH}$ 330–334 m$\mu$ (A$_M$ 12,349)

*Part C.—Preparation of 1-(β-D-Xylofuranosyl)-5-Methylcytosine Hydrochloride*

In a glass liner enclosed in a steel bomb, 1.466 g. (2.5 millimoles) of 1-(2,3,5-tri-O-benzoyl-β-D-xylofuranosyl)-4-thio-5-methyluracil (Part B) and 25 ml. of absolute methanol previously saturated at 0° C. with anhydrous ammonia was heated at 95 to 103° C. for 28 hours. The methanol and excess ammonia were removed from the orange-colored reaction mixture under reduced pressure at a bath temperature of about 55° C. The semi-solid residue (1.41 g.) was treated with absolute ethanol, the solvent removed as above, the residue held at 0.3 mm. pressure for a short time (bath temperature, 40° C.), then held under reduced pressure at a bath temperature of about 45° C. overnight, yielding 1.3 g. of a straw-colored, amorphous, somewhat gummy residue. This gummy residue was triturated with chloroform, collected on a filter, and washed with additional chloroform. After repeating the trituration with chloroform and finally washing with anhydrous ether, 725 mg. of a dark tan powder was obtained. This powder was dissolved in 15 ml. of warm, absolute ethanol, filtered from a small amount of dark, insoluble substance, and the filtrate was swirled intermittently during 2 hours with Darco G–60. The suspension was filtered through a bed of shredded asbestos, and the filter-cake was washed with absolute ethanol. The combined pale yellow filtrate (30 ml.) was diluted with an equal volume of anhydrous ether, cooled in an ice-bath, and an excess of dry hydrogen chloride was introduced. Upon chilling the solution at −20° C. and scratching, crystallization occurred rapidly. After collecting on a filter, washing with anhydrous ether, and oven-drying at 85° C., 285 mg. of 1-(β-D-xylofuranosyl)-5-methylcytosine hydrochloride having a melting point of 187 to 190° C. was obtained. A warm solution of this crystalline material in 20 ml. of 95% ethanol was diluted slowly with 25 ml. of dry ether. A distinctly cloudy mixture was obtained in which, on rewarming, crystallization occurred spontaneously. After being refrigerated at 0° C. for about 12 hours, the crystalline product was collected on a filter, washed with cold 95% ethanol-ether (1:1 by volume), and dried in an oven at 85° C. This procedure yielded 220 mg. of crystals having a melting point of 192 to 193.5° C. When recrystallized twice from ethanol-ether the 1-(β-D-xylofuranosyl)-5-methylcytosine hydrochloride melted at 202 to 204° C.

Optical rotation: $[\alpha]_D^{24°}$ −3° (c. 0.4995, N NaOH); $[\alpha]_D^{24°}$ +30°. (c. 0.9395, $H_2O$).

Ultraviolet absorption:

$\lambda_{min.}^{0.1\,N\,NaOH}$ 254–255 m$\mu$ ($A_M$ 4,611)

$\lambda_{max.}^{0.1\,N\,NaOH}$ 278–280 m$\mu$ ($A_M$ 8,706)

$\lambda_{min.}^{0.1\,N\,HCl}$ 244–245 m$\mu$ ($A_M$ 829)

$\lambda_{max.}^{0.1\,N\,HCl}$ 288 m$\mu$ ($A_M$ 12,577)

Characteristic infrared absorption frequencies (cm.$^{-1}$): 3400, 3170; 1717; 1646; 1576, 1521; 1095.

$R_f$ 0.25 (81% n-butanol, descending).

EXAMPLE 14.—PREPARATION OF 1-(β-D-XYLOFURANOSYL) - N,5 - DIMETHYLCYTOSINE HYDROCHLORIDE

In a glass liner enclosed in a steel bomb, a solution of 1.03 g. (1.75 millimoles) of 1-(2,3,5-tri-O-benzoyl-β-D-xylofuranosyl)-4-thio-5-methyluracil (Example 13, Part B) and 20 ml. of absolute methanol, previously saturated with anhydrous methylamine at 0° C. was heated at 103° C. for 37 hours. The methanol and excess methylamine were removed under reduced pressure at a bath temperature of about 45° C. The oily residue was dissolved in absolute ethanol, and this solvent was removed. The residue was held under 0.2 mm. pressure for 1.5 hours at a bath temperature of about 53° C., then held at reduced pressure at a bath temperature of about 40° C. for 36 hours. The dark semi-solid residue (1.185 g.) on being triturated, first with chloroform, then with a chloroform-ether mixture, changed to a light tan amorphous material which then was dissolved in absolute ethanol. The ethanol solution was swirled intermittently with Darco G–60 during 5 hours, filtered, and the filter-cake was washed with sufficient absolute ethanol to give a combined filtrate of approximately 25 ml. The filtrate was diluted with an equal volume of anhydrous ether. The resulting solution was cooled in an ice-bath and was treated with an excess of dry hydrogen chloride. A white precipitate formed immediately. After refrigeration at 0° C., filtering, washing with a cold 1:1 (by volume) solution of absolute ethanol-ether, and oven-drying at 85° C. there was obtained 340 mg. of product having a melting point of 207 to 210° C. On crystallization from 95% ethanol (75 ml.), anhydrous ether (37 ml.), there was obtained 270 mg. of glistening plates melting at 219 to 220.5° C. Recrystallization from 95% ethanol-ether gave crystals of 1-(β-D-xylofuranosyl) - N,5 - dimethylcytosine hydrochloride which melted at 220 to 222° C. (decomposition).

Analysis.—Calculated for $C_{11}H_{18}ClN_3O_5$: C, 42.93; H, 5.90; Cl, 11.52; N, 13.66. Found: C, 42.88; H, 6.06; Cl, 11.53; N, 13.51.

Optical rotation: $[\alpha]_D^{24°}$ +41° (c. 0.5023, $H_2O$).

Ultraviolet absorption:

$\lambda_{min.}^{0.1\,N\,NaOH}$ 253–254 m$\mu$ ($A_M$ 7,011)

$\lambda_{max.}^{0.1\,N\,NaOH}$ 276–277 m$\mu$ ($A_M$ 10,984)

$\lambda_{min.}^{0.1\,N\,HCl}$ 246 m$\mu$ ($A_M$ 1,774)

$\lambda_{max.}^{0.1\,N\,HCl}$ 285–287 m$\mu$ ($A_M$ 13,934)

Characteristic infrared absorption frequencies (cm.$^{-1}$): 3455, 3270, 3210, 3120; 1716, 1701; 1661; 1636, 1540; 1108, 1096, 1024.

$R_f$ 0.42 (81% n-butanol, descending).

Following the procedure of Example 14, but substituting ethylamine, butylamine, isobutylamine, amylamine, octylamine, allylamine, dimethylamine, diethylamine, dipropylamine, diamylamine, diheptylamine, diallylamine, cyclohexylamine, N-methylcyclopentylamine, benzylamine, furfurylamine, N-allylethylamine, 2-aminopyrrole, ethyleneimine, piperidine, morpholine, thiamorpholine, aniline, phenethylamine, 2-methylpyrrolidine, and cyclopentenylamine for methylamine, the corresponding N-substituted 1(β-D-xylofuranosyl)-5 methylcytosine hydrochlorides are obtained, wherein the respective N-substituents are N-ethyl, N-butyl, N-isobutyl, N-amyl, N-octyl, N-allyl, N,N-dimethyl, N,N-diethyl, N,N-dipropyl, N,N-diamyl, N,N-diheptyl, N-cyclohexyl, N-methyl-N-cyclopentyl, N-benzyl, N-furfuryl, N-allyl-N-ethyl, N-(2-pyrrolyl), N,N-ethylene, N,N-pentamethylene, N,N-(3-oxapentamethylene), N,N-(3-thiapentamethylene), N-phenyl, N-phenethyl, N-(1-methyltetramethylene), and N-cyclopentenyl.

EXAMPLE 15.—PREPARATION OF 1-(β-D-RIBOFURANOSYL) - N - FURFURYL - 5 - NITROCYTOSINE HYDROCHLORIDE

Following the procedure of Example 7, Part A, but substituting 1-(β-D-ribofuranosyl)-5-nitrouracil for 1-(β-D-ribofuranosyl)-5-ethyluracil, 1-(2,3,5-tri-O-acetyl-β-D-ribofuranosyl)-5-nitrouracil is obtained. Following the procedure of Example 7, Part B, but substituting 1-(2,3,5-tri-O-acetyl-β-D-ribofuranosyl)-5-nitrouracil for 1-(2,3,5-tri-O-acetyl-β-D-ribofuranosyl)-5-ethyluracil, 1-(2,3,5-tri-O-acetyl-β-D-ribofuranosyl)-4-thio-5-nitrouracil is obtained. Following the procedure of Example 8, but substituting 1-(2,3,5-tri-O-acetyl-β-D-ribofuranosyl)-4-thio-5-nitrouracil for 1-(2,3,5-tri-O-acetyl-β-D-ribofuranosyl)-4-thio-5-ethyluracil and substituting furfurylamine for methylamine, 1-(β-D-ribofuranosyl)-N-furfuryl-5-nitrocytosine hydrochloride is prepared.

EXAMPLE 16.—PREPARATION OF 1-(β-D-RIBOFURANOSYL) - N,N - (3 - OXAPENTAMETHYLENE) - 5 - (HYDROXYMETHYL)CYTOSINE HYDROCHLORIDE

Following the procedure of Example 5, Part A, but substituting 1-(β-D-ribofuranosyl)-5-(hydroxymethyl)-uracil for 1-(β-D-ribofuranosyl)-5-methyluracil, 1-(2,3,5-tri - O - acetyl - β - D - ribofuranosyl) - 5 - (acetoxymethyl)uracil is obtained. Following the procedure of Example 5, Part B, but substituting 1-(2,3,5-tri-O-acetyl-β-D-ribofuranosyl)-5-(acetoxymethyl)uracil for 1-(2,3,5-tri-O-acetyl-β-D-ribofuranosyl)-5-methyluracil, 1-(2,3,5-tri-O - acetyl - β - D - ribofuranosyl) - 4 - thio - 5 - (acetoxymethyl)uracil is obtained. Following the procedure of Example 6 but substituting 1-(2,3,5-tri-O-acetyl-β-D-ribofuranosyl)-4-thio-5-(acetoxymethyl)uracil for 1-(2,3,5-tri - O - acetyl - β - D - ribofuranosyl) - 4 - thio - 5 - methyluracil and substituting morpholine for methylamine, 1-(β - D - ribofuranosyl) - N,N - (3 - oxapentamethylene)-5-(hydroxymethyl)cytosine hydrochloride is prepared.

EXAMPLE 17.—PREPARATION OF 1-(β-D-MANNOPYRANOSYL) - N,N - DIMETHYL - 5 - HEXYLCYTOSINE HYDROCHLORIDE

Following the procedure of Example 7, Part A, but substituting 1-(β-D-mannopyranosyl)-5-hexyluracil for 1-(β-D-ribofuranosyl)-5-ethyluracil, 1-(2,3,4,6-tetra-O-acetyl-β-D-mannopyranosyl)-5-hexyluracil is obtained. Following the procedure of Example 7, Part B, but substituting 1-(2,3,4,6-tetra-O-acetyl-β-D-mannopyranosyl)-5-hexyluracil for 1-(2,3,5-tri-O-acetyl-β-D-ribofuranosyl)-5-ethyluracil, 1-(2,3,4,6-tetra-O-acetyl-β-D-mannopyranosyl)-4-thio-5-hexyluracil is obtained. Following the procedure of Example 8, but substituting 1-(2,3,4,6-tetra-O-acetyl-β-D-mannopyranosyl)-4-thio-5-hexyluracil for 1-(2,3,5 - tri - O - acetyl - β - D - ribofuranosyl) - 4 - thio-5-ethyluracil and substituting dimethylamine for methylamine, 1-(β-D-mannopyranosyl)-N,N-dimethyl-5-hexylcytosine hydrochloride is prepared.

EXAMPLE 18.—PREPARATION OF 1-(2-DEOXY-β-D - RIBOFURANOSYL) - N,N - DIALLYL - 5 - HYDROXYCYTOSINE

Following the procedure of Example 2, Part A, but substituting 1-(2-deoxy-β-D-ribofuranosyl)-5-hydroxyuracil for 1-(2-deoxy-β-D-ribofuranosyl)-5-methyluracil, 1(3,5-di-O-acetyl-2-deoxy-β-D-ribofuranosyl)-5-acetoxyuracil is obtained. Following the procedure of Example 2, Part B, but substituting 1-(3,5-di-O-acetyl-2-deoxy-β-D-ribofuranosyl)-5-acetoxyuracil for 1-(3,5-di-O-acetyl-2-deoxy-β-D-ribofuranosyl)-5-methyluracil, 1-(3,5-di-O-acetyl-2-deoxy-β-D-ribofuranosyl)-4-thio-5-acetoxyuracil is obtained. Following the procedure of Example 3, but substituting 1 - (3,5 - di - O - acetyl - 2 - deoxy - β - D - ribofuranosyl)-4-thio-5-acetoxyuracil for 1-(3,5-di-O-acetyl-2-deoxy-β-D-ribofuranosyl)-4-thio-5-methyluracil and substituting diallylamine for methylamine, 1-(2-deoxy-β-D-ribofuranosyl)-N,N-diallyl-5-hydroxycytosine is prepared.

EXAMPLE 19.—PREPARATION OF 1-(β-D-LYXOFURANOSYL) - N - METHYL - 5 - PHENYLCYTOSINE HYDROCHLORIDE

Following the procedure of Example 7, Part A, but substituting 1-(β-D-lyxofuranosyl)-5-phenyluracil for 1-(β-D-ribofuranosyl)-5-ethyluracil, 1-(2,3,5-tri-O-acetyl-β-D-lyxofuranosyl)-5-phenyluracil is obtained. Following the procedure of Example 7, Part B, but substituting 1 - (2,3,5 - tri - O - acetyl - β - D - lyxofuranosyl) - 5-phenyluracil for 1-(2,3,5-tri-O-acetyl-β-D-ribofuranosyl)-5-ethyluracil, 1-(2,3,5-tri-O-acetyl-β-D-lyxofuranosyl)-4-thio-5-phenyluracil is obtained. Following the procedure of Example 8, but substituting 1-(2,3,5-tri-O-acetyl-β-D-lyxofuranosyl)-4-thio-5-phenyluracil for 1-(2,3,5-tri-O-acetyl-β-D-ribofuranosyl)-4-thio-5-ethyluracil, 1-(β-D-lyxofuranosyl)-N-methyl-5-phenylcytosine hydrochloride is prepared.

EXAMPLE 20.—PREPARATION OF 1-(β-D-GALACTOPYRANOSYL)-N,N-DIMETHYL-5-CYCLOHEXYLCYTOSINE

Following the procedure of Example 9, Part A, but substituting 1 - (2,3,4,6-tetra-O-acetyl-β-D-galactopyranosyl)-5-cyclohexyluracil for 1-(2,3,4,6-tetra-O-acetyl-β-D-glucopyranosyl)-5-methyluracil, 1-(2,3,4,6-tetra-O-acetyl-β - D-galactopyranosyl)-4-thio-5-cyclohexyluracil is obtained. Following the procedure of Example 11, but substituting 1-(2,3,4,6-tetra-O-acetyl-β-D-galactopyranosyl)-4-thio-5-cyclohexyluracil for 1-(2,3,4,6-tetra-O-acetyl - β-D-glucopyranosyl)-4-thio-5-methyluracil, 1-(β-D-galactopyranosyl)-N,N-dimethyl-5-cyclohexylcytosine is prepared.

EXAMPLE 21.—PREPARATION OF 1-(β-D-RIBOFURANOSYL)-5-BENZYLCYTOSINE HYDROCHLORIDE

Following the procedure of Example 7, Part A, but substituting 1-(β-D-ribofuranosyl)-5-benzyluracil for 1-(β-D-ribofuranosyl)-5-ethyluracil, 1-(2,3,5-tri-O-acetyl-β-D-ribofuranosyl)-5-benzyluracil is obtained. Following the procedure of Example 7, Part B, but substituting 1-(2,3,5-tri-O-acetyl-β-D-ribofuranosyl)-5-benzyluracil for 1-(2,3,5-tri-O-acetyl-β-D-ribofuranosyl)-5-ethyluracil, 1-(2,3,5-tri-O-acetyl-β-D-ribofuranosyl)-4-thio-5-benzyl uracil is obtained. Following the procedure of Example 7, Part C, but substituting 1-(2,3,5-tri-O-acetyl-β-D-ribofuranosyl)-4-thio-5-benzyluracil for 1-(2,3,5-tri-O-acetyl-β-D-ribofuranosyl)-4-thio-5-ethyluracil, 1-(β-D-ribofuranosyl)-5-benzylcytosine hydrochloride is prepared.

EXAMPLE 22.—PREPARATION OF 1-(β-D-XYLOPYRANOSYL) - 5-ALLYLCYTOSINE HYDROCHLORIDE

Following the procedure of Example 7, Part A, but substituting 1-(β-D-xylopyranosyl)-5-allyluracil for 1-(β-D-ribofuranosyl)-5-ethyluracil, 1-(2,3,4-tri-O-acetyl-β-D-xylopyranosyl)-5-allyluracil is obtained. Following the procedure of Example 7, Part B, but substituting 1-(2,3,4-tri-O-acetyl-β-D-xylopyranosyl)-5-allyluracil for 1-(2,3,5-tri-O-acetyl-β-D-ribofuranosyl)-5-ethyluracil, 1-(2,3,4-tri-O - acetyl-β-D-xylopyranosyl)-4-thio-5-allyluracil is obtained. Following the procedure of Example 7, Part C, but substituting 1-(2,3,4-tri-O-acetyl-β-D-xylopyranosyl)-4-thio-5-allyluracil for 1-(2,3,5-tri-O-acetyl-β-D-ribofuranosyl) - 4-thio-5-ethyluracil, 1-(β-D-xylopyranosyl)-5-allylcytosine hydrochloride is prepared.

EXAMPLE 23.—PREPARATION OF 1-(β-D-GLUCOFURANOSYL) - 5 - $\Delta^3$-CYCLOPENTENYL)CYTOSINE Following the procedure of Example 9, Part A, but substituting 1-(2,3,5,6-tetra-O-acetyl-β-D-glucofuranosyl)-5-$\Delta^3$-cyclopentenyl)uracil for 1-(2,3,4,6-tetra-O-acetyl-β-D-glucopyranosyl)-5-methyluracil, 1-(2,3,5,6-tetra-O-acetyl - β - D-glucofuranosyl)-4-thio-5-($\Delta^3$-cyclopentenyl)-uracil is obtained. Following the procedure of Example 9, Part C(I), but substituting 1-(2,3,5,6-tetra-O-acetyl-β-D-glucofuranosyl)-4-thio-5-($\Delta^3$-cyclopentenyl)uracil for 1 - (2,3,4,6 - tetra-O-acetyl-β-D-glucopyranosyl)-4-thio-5-methyluracil, 1 - (β-D-glucofuranosyl)-5-($\Delta^3$-cyclopentenyl)-cytosine is prepared.

EXAMPLE 24.—PREPARATION OF 1-(α-L-GALACTOPYRANOSYL) - N-(2-FURFURYL)-5-ISOPROPYLCYTOSINE HYDROCHLORIDE

Following the procedure of Example 7, Part A, but substituting 1 - (α-L-galactopyranosyl)-5-isopropyluracil for 1-(β-D-ribofuranosyl)-5-ethyluracil, 1-(2,3,4,6-tetra-O-acetyl-α-L-galactopyranosyl)-5-isopropyluracil is obtained. Following the procedure of Example 7, Part B, but substituting 1-(2,3,4,6-tetra-O-acetyl-α-L-galactopyranosyl)-5-isopropyluracil for 1-(2,3,5-tri-O-acetyl-β-D-ribofuranosyl)-5-ethyluracil, 1-(2,3,4,6-tetra-O-acetyl-α-L-galactopyranosyl) - 4-thio-5-isopropyluracil is obtained. Following the procedure of Example 8, but substituting 1 - (2,3,4,6-tetra-O-acetyl-α-L-galactopyranosyl)-4-thio-5-isopropyluracil for 1 - (2,3,5-tri-O-acetyl-β-D-ribofuranosyl)-4-thio-5-ethyluracil, and substituting 2-furfurylamine for methylamine, 1-(α-L-galactopyranosyl)-N-(2-furfuryl)-5-isopropylcytosine hydrochloride is prepared.

EXAMPLE 25.—PREPARATION OF 1-β-D-ARABINOFURANOSYLCYTOSINE

*Part A.—Preparation of 1-(2,3,5-Tri-O-Acetyl-β-D-Arabinofuranosyl)-4-Thiouracil*

A mixture of 1.85 g. (5.0 millimoles) of 1-(2,3,5-tri-O-acetyl-β-D-arabinofuranosyl)uracil, 1.23 g. (5.55 millimoles) of phosphorus pentasulfide, and 30 ml. of pyridine was heated under gentle reflux for 2.5 hours with exclusion of moisture. The reaction mixture was cooled, and the supernatant solution was transferred by means of a pipette into a mixture of crushed ice and water. The reaction flask was washed twice with pyridine, and these washings were added to the ice-water mixture. This mixture was kept at about 25° C. until the ice had melted, and was then stored at 0° C. for one hour. A pale yellow precipitate that formed was collected on a filter, washed with ice-water, and dried in air.

This material was triturated with chloroform, and the chloroform mixture was filtered. A small amount of undissolved material collected on the filter and it was washed with chloroform. The chloroform solution (filtrate plus washings) was washed three times with ice-water, twice with ice-cold 3 N sulfuric acid, twice with ice-cold, saturated aqueous sodium bicarbonate solution, twice with ice-water, and then dried over anhydrous sodium sulfate. The chloroform was removed under reduced pressure at a bath temperature of about 40° C., leaving a yellow, somewhat gummy residue. This yellow residue was dissolved in absolute methanol which was then evaporated at reduced pressure at about 40° C., and the residue was then held for 2 hours at 0.5 to 2.0 mm. pressure and a bath temperature of about 50° C. There was thus obtained 1.69 g. of 1-(2,3,5-tri-O-acetyl-β-D-arabinofuranosyl)-4-thiouracil.

*Part B.—Preparation of 1-β-D-Arabinofuranosylcytosine*

In a glass liner, a mixture of 1.16 g. (3.0 millimoles) of 1-(2,3,5-tri-O-acetyl-β-D-arabinofuranosyl)-4-thio-uracil prepared in Part A and about 60 ml. of absolute methanol which had been saturated with anhydrous ammonia at 0° C. was heated in a steel bomb at 98° to 105° C. for 35 hours. After cooling to about 25° C. and venting the bomb, the dark solution was filtered into a round-bottom flask. The methanol and excess ammonia were then removed under reduced pressure at about 25° C. The residual syrup was dissolved in absolute methanol, and the methanol was removed under reduced pressure at a bath temperature of about 40° C. This procedure of dissolving in absolute methanol and removing the solvent was repeated, and the resude was held under reduced pressure at a bath temperature of 45° C. for 12 hours.

The resulting semi-solid was triturated thoroughly with absolute methanol, and the resulting suspension was chilled at 0° C. A pale tan solid that separated was collected on a filter and washed repeatedly with methanol. After washing with anhydrous ether, there was obtained 430 mg. of 1-β-D-arabinofuranosylcytosine.

*Part C.—Preparation of 1-β-D-Arabinofuranosylcytosine Hydrochloride*

The absolute methanolic filtrate obtained after triturating and filtering the 1-β-D-arabinofuranosylcytosine in Part B above was warmed and stirred with decolorizing charcoal. The mixture was filtered through a bed of filter aid, and the filter bed was washed repeatedly with absolute methanol. The combined filtrate and washings were pale yellow. The solution was diluted to faint cloudiness with anhydrous ether, and an excess of anhydrous hydrogen chloride was introduced. Crystallization began at about 25° C., and further crystallization was induced by chilling at 0° C. for 14 hours. The crystalline product was collected on a filter, washed with anhydrous ether, and dried in air. There was thus obtained 180 mg. of pale yellow 1-β-D-arabinofuranosylcytosine hydrochloride melting at 186° to 189° C.

The pale yellow product was dissolved in warm, absolute methanol, and the solution after mixing with decolorizing charcoal was filtered through a bed of filter aid. The filter bed was washed with warm absolute methanol, and the combined methanolic filtrate and washings were warmed and diluted with anhydrous ether to incipient crystallization. The methanol-ether mixture was kept at about 25° C. for about 1 hour and then chilled, first at 0° C., and then at —20° C. The resulting colorless needles were collected on a filter, washed with anhydrous ether, and dried at 85° C., yielding 100 mg. of 1-β-D-arabinofuranosylcytosine hydrochloride having a melting point of 186° to 188° C.

*Analysis.*—Calculated for $C_9H_{14}ClN_3O_5$: C, 38.65; H, 5.05; Cl, 12.68; N, 15.01. Found: C, 38.83; H, 5.05; Cl, 12.77; N, 14.96.

Optical rotation: $[\alpha]_D^{23°}$ +129° (c. 1.411, $H_2O$).

Ultraviolet absorption:

$\lambda_{min.}^{0.1\ N\ NaOH}$ 250–252 m$\mu$ ($A_M$ 5,490)

$\lambda_{min.}^{H_2O}$ 247–248 m$\mu$ ($A_M$ 5,262)

$\lambda_{min.}^{0.1\ N\ HCl}$ 240–241 m$\mu$ ($A_M$ 1,392)

$\lambda_{max.}^{0.1\ N\ NaOH}$ 228–230 m$\mu$; 274 m$\mu$ ($A_M$ 8,309; 9,830)

$\lambda_{max.}^{H_2O}$ 273–274 m$\mu$ ($A_M$ 9,849)

$\lambda_{max.}^{0.1\ N\ HCl}$ 280–281 m$\mu$ ($A_M$ 13,276)

Characteristic infrared absorption frequencies (cm.$^{-1}$): 3340, 3280, 3220 sh, 3120, 3100 sh; 2780, 2740; 1715, 1665; 1635, 1605, 1550, 1490; 1275, 1245, 1182, 1130, 1105, 1095, 1052.

$R_f$ 0.70 (65% (v./v.) aqueous isopropanol—2 N HCl, descending).

EXAMPLE 26.—PREPARATION OF 1-(β-D-ARABINOFURANOSYL)-N-METHYLCYTOSINE

*Part A.—Preparation of 1-(β-D-Arabinofuranosyl)-N-Methylcytosine*

In a glass liner, 772 mg. (2.0 millimoles) of 1-(2,3,5-tri-O-acetyl-β-D-arabinofuranosyl)-4-thiouracil prepared as in Example 25, Part A, was dissolved in 50 ml. of absolute methanol which had been saturated with anhydrous methylamine at 0° C. The reaction mixture was then heated in a steel bomb at 95° to 105° C. for 24 hours. After cooling and venting the bomb, the methanolic solution in the glass liner contained crystals which were collected on a filter. The crystals were washed with cold absolute methanol and dried in air. There was obtained 465 mg. of 1-(β-D-arabinofuranosyl)-N-methylcytosine having a melting point of 257° to 260° C.

Ultraviolet absorption:

$\lambda_{min.}^{0.1\ N\ HCl}$ 243 m$\mu$ $\lambda_{max.}^{0.1\ N\ HCl}$ 217 m$\mu$; 281–282 m$\mu$

*Part B.—Preparation of 1-(β-D-Arabinofuranosyl)-N-Methylcytosine Hydrochloride*

Approximately 450 mg. of 1-(β-D-arabinofuranosyl)-N-methylcytosine prepared in Part A was comminuted to a fine powder, and the powder was suspended in 7 ml. of absolute methanol. Solution was effected by introducing an excess of anhydrous hydrogen chloride. The solution thus formed was warmed, stirred with decolorizing charcoal, and filtered through a bed of filter aid. The filter bed was washed with warm absolute methanol containing anhydrous hydrogen chloride, and the combined filtrate and washings were warmed and diluted with an equal volume of anhydrous ether. Crystallization occurred rapidly. The suspension of crystals was refrigerated at 0° C. for 12 hours and then at —20° C. for 3 hours. The crystals were collected on a filter, washed with anhydrous ether, and dried in air. There was thus obtained 450 mg. of 1-(β-D-arabinofuranosyl)-N-methylcytosine hydrochloride, having a melting point of 182.5° to 184° C.

*Analysis.*—Calculated for $C_{10}H_{16}ClN_3O_5$: C, 40.89; H, 5.49; Cl, 12.07; N, 14.34. Found: C, 40.68; H, 5.07; Cl, 11.94; N, 14.46.

Optical rotation: $[\alpha]_D^{23°}$ +127° (c. 0.444, $H_2O$).

Ultraviolet absorption:

$\lambda_{min.}^{0.1\ N\ NaOH}$ 228–230 m$\mu$; 249 m$\mu$ (A$_M$ 8,832; 6,860)

$\lambda_{max.}^{0.1\ N\ NaOH}$ 233–234 m$\mu$; 273 m$\mu$ (A$_M$ 8,955; 12,159)

$\lambda_{min.}^{H_2O}$ 248 m$\mu$ (A$_M$ 9,569)

$\lambda_{min.}^{0.1\ N\ HCl}$ 242 m$\mu$ (A$_M$ 2,142)

$\lambda_{max.}^{H_2O}$ 270–271 m$\mu$ (A$_M$ 13,600)

$\lambda_{max.}^{0.1\ N\ HCl}$ 216–217 m$\mu$; 279–281 m$\mu$ (A$_M$ 9,178; 14,482)

Characteristic infrared absorption frequencies (cm.$^{-1}$): 3320, 3160, 3060; 2760, 2680, 2570; 1730, 1650; 1600, 1565, 1515; 1288, 1245, 1160, 1120, 1087, 1067, 1055, 1045, 1017, 1000.

R$_f$ 0.78 (65% (v./v.) aqueous isopropanol—2 N HCl, descending).

EXAMPLE 27.—PREPARATION OF 1-($\beta$-D-ARABINOFURANOSYL)-N,N-ETHYLENECYTOSINE

A solution of 386 mg. (1 millimole) of 1-(2,3,5-tri-O-acetyl-$\beta$-D-arabinofuranosyl)-4-thiouracil (prepared as in Example 25, Part A) in 10 ml. of ethyleneimine was heated under gentle reflux (external moisture was excluded) for 21 hours. After holding this reaction mixture at 0° C. for about 12 hrs. the volatile components were removed under reduced pressure and a bath temperature of about 45° to 65° C. A thick syrupy residue thus obtained was dissolved in absolute ethanol and the ethanol was evaporated at a bath temperature of about 65° to 75° C., initially at 20 mm. pressure and finally at 0.2 to 0.3 mm. pressure. A portion of the viscous, slightly opalescent syrup thus obtained was washed with several portions of acetone. The last traces of acetone were removed at about 25 mm. pressure, and the 1-($\beta$-D-arabinofuranosyl)-N,N-ethylenecytosine thus obtained was dissolved in absolute methanol. The methanol solution was diluted with anhydrous ether, and an excess of dry hydrogen chloride was introduced, thus forming a solution of 1-($\beta$-D-arabinofuranosyl)-N,N-ethylenecytosine hydrochloride. The solution of the hydrochloride was further diluted with anhydrous ether until a gum separated. The gum was recovered from the solvent mixture by decantation and it was washed several times with anhydrous ether. The washed product gave a white solid upon trituration with acetone. All traces of acetone were removed under reduced pressure, and the 1-($\beta$-D-arabinofuranosyl)-N,N-ethylenecytosine hydrochloride thus obtained had a qualitative ultraviolet absorption spectrum as follows:

$\lambda_{min.}^{0.1\ N\ HCl}$ 243–244 m$\mu$ $\lambda_{max.}^{0.1\ N\ HCl}$ 284 m$\mu$ $\lambda_{min.}^{0.1\ N\ NaOH}$ 251 m$\mu$ $\lambda_{max.}^{0.1\ N\ NaOH}$ 274–275 m$\mu$ EXAMPLE 28.—PREPARATION OF 1-(2-DEOXY-$\beta$-D-XYLOFURANOSYL)-5-METHYLCYTOSINE

*Part A.—Preparation of 1-(3,5-Di-O-Acetyl-2-Deoxy-$\beta$-D-Xylofuranosyl)-5-Methyluracil*

To a suspension of 363 mg. (1.5 millimoles) of 1-(2-deoxy-$\beta$-D-xylofuranosyl)-5-methyluracil in 5.0 ml. of acetic anhydride was added 0.3 ml. of anhydrous pyridine. While excluding moisture, the reaction mixture was heated in a bath at 68° C. Solution was effected within a short time by intermittent swirling of the reaction flask. Heating was continued at 67° to 71.5° C. for 3¼ hours, and then the reaction mixture was allowed to cool. The volatile components were removed by distillation at 0.2 to 0.5 mm. pressure and a bath temperature of about 40° C. The residue was dissolved in absolute ethanol and the solvent was distilled at a bath temperature of about 45° C., first at 20 to 30 mm. pressure, and then at 0.2 to 0.5 mm. pressure. This procedure was repeated and then the residue was dissolved in chloroform. The chloroform solution was washed twice with ice-water, twice with cold 3 N sulfuric acid, twice with cold saturated aqueous sodium bicarbonate solution, and twice with ice-water. The washed solution was then swirled with decolorizing charcoal, the mixture was filtered, the filter was washed with chloroform, and the combined filtrate and washings were dried over anhydrous sodium sulfate. The chloroform was removed under reduced pressure at a bath temperature of about 40° C., and the residue was held at 0.2 to 0.5 mm. pressure for 12 hours. The dry, amorphous residue was then dissolved in absolute ethanol, and the solvent was removed under reduced pressure at a bath temperature of 40° to 45° C. After repeating the solution in ethanol and distillation, the amorphous residue was held under 0.2 to 0.5 mm. pressure for several hours. There was thus obtained 400 mg. of 1-(3,5-di-O-acetyl-2-deoxy-$\beta$-D-xylofuranosyl)-5-methyluracil.

*Part B.—Preparation of 1-(3,5-Di-O-Acetyl-2-Deoxy-$\beta$-D-Xylofuranosyl)-4-Thio-5-Methyluracil*

A mixture of 400 mg. (1.23 millimoles) of 1-(3,5-di-O-acetyl-2-deoxy-$\beta$-D-xylofuranosyl)-5-methyluracil (prepared in part A), 306 mg. (1.375 millimoles) of phosphorus pentasulfide, and 10.0 ml. of anhydrous pyridine was heated under gentle reflux for 2.5 hours. The resulting yellow supernatant solution was transferred by means of a pipette into a mixture of crushed ice and water. A tarry residue in the reaction flask was washed three times with pyridine and the washings were added to the ice-water mixture. The ice-water mixture was refrigerated at 0° C. for 12 hours and a trace of flocculent precipitate was removed by filtration. The clear filtrate was chilled and acidified with cold 12 N sulfuric acid. The acidified filtrate was extracted with several portions of chloroform, and the combined chloroform extracts were washed twice with ice-water, twice with cold saturated aqueous sodium bicarbonate solution, and twice with ice-water. The washed chloroform solution was dried over anhydrous sodium sulfate, and the chloroform was removed under reduced pressure at a bath temperature of about 45° C. The residue was swirled with absolute methanol, and the methanol was removed under reduced pressure at a bath temperature of 45° C. The yellow, amorphous residue thus obtained was kept at 0.2 to 0.5 mm. pressure and a bath temperature of 40° to 45° C. for 2 hours, yielding 360 mg. of 1-(3,5-di-O-acetyl-2-deoxy-$\beta$-D-xylofuranosyl)-4-thio-5-methyluracil.

Ultraviolet absorption:

$\lambda_{min.}^{95\%\ EtOH}$ 230 m$\mu$ (A$_M$ 3,193); 290 m$\mu$ (A$_M$ 2,568)

$\lambda_{max.}^{95\%\ EtOH}$ 256–258 m$\mu$ (A$_M$ 4,805); 334 m$\mu$ (A$_M$ 13,163)

*Part C.—Preparation of 1-(2-Deoxy-$\beta$-D-Xylofuranosyl)-5-Methylcytosine and Hydrochloride Thereof*

Seventy-five ml. of absolute methanol which had been saturated with anhydrous ammonia at 0° C. was added to 1.35 g. (3.93 millimoles) of 1-(3,5-di-O-acetyl-2-deoxy-$\beta$-D-xylofuranosyl)-4-thio-5-methyluracil, prepared as in Part B, in a glass liner. The reaction mixture was heated in a steel bomb at 95° to 105° C. for 35 hours. After cooling, the bomb was vented and the contents of the glass liner were transferred to a round-bottom flask by rinsing with absolute methanol. The methanol and excess ammonia were then distilled under reduced pressure at a bath temperature of about 40° C. The residue was swirled with absolute ethanol, the ethanol was removed under reduced pressure at a bath temperature of about 40° C., and the residue was held at 0.2 to 0.5 mm. pressure and a bath temperature of about 45° C. for 1 hour. The 1-(2-deoxy-$\beta$-D-xylofuranosyl)-5-methylcytosine thus obtained was then dissolved in hot absolute methanol and the solution was swirled with decolorizing charcoal. The mixture was filtered through a bed of filter aid and the filter bed was washed with hot absolute methanol.

The clear filtrate and washings had a combined volume of 125 ml. After diluting with 100 ml. of anhydrous ether, the resulting solution was chilled and an excess of dry hydrogen chloride was introduced. The acidified solution was diluted with 1,600 ml. of anhydrous ether, added portion-wise, and the resulting turbid solution was refrigerated at −20° C. The crystals that formed were collected on a filter, washed with anhydrous ether, and dried in air. There was thus obtained 400 mg. of product having a melting point of 134.5° to 136° C. On recrystallization from absolute methanol-anhydrous ether there was obtained 1-(2-deoxy-β-D-xylofuranosyl)-5-methylcytosine hydrochloride having a melting point of 142.5° to 143.5° C.

*Analysis.*—Calculated for $C_{10}H_{16}ClN_3O_4$: C, 43.25; H, 5.81; Cl, 12.77; N, 15.13. Found: C, 43.17; H, 5.89; Cl, 12.77; N, 15.07.

Optical rotation:

$[\alpha]_D^{23°}$ +54° (c. 0.5168, $H_2O$).

Ultraviolet absorption:

$\lambda_{min.}^{0.1\,N\,NaOH}$ 252 mμ ($A_M$ 4,282)

$\lambda_{min.}^{H_2O}$ 248 mμ ($A_M$ 3,051)

$\lambda_{min.}^{0.1\,N\,HCl}$ 242–243 mμ ($A_M$ 774)

$\lambda_{max.}^{0.1\,N\,NaOH}$ 276 mμ ($A_M$ 8,235)

$\lambda_{max.}^{H_2O}$ 279–280 mμ ($A_M$ 8,953)

$\lambda_{max.}^{0.1\,N\,HCl}$ 212 mμ; 285–286 mμ ($A_M$ 10,973; 12,043)

Characteristic infrared absorption frequencies (cm.$^{-1}$): 3470 sh., 3340, 3220, 3050; 2690; 1715, 1665, 1643 sh., 1550, 1535; 1280, 1105, 1075, 1055, 1017, 1000.

$R_f$ 0.79 (65% (v./v.) aqueous isopropanol—2 N HCl, descending).

EXAMPLE 29.—PREPARATION OF 1-(β-D-LYXOFURANOSYL)-5-METHYLCYTOSINE

Part A.—Preparation of 1-(2,3,5-Tri-O-Acetyl-β-D-Lyxofuranosyl)-5-Methyluracil A mixture of 1.29 g. (5.0 millimoles) of finely powdered 1-(β-D-lyxofuranosyl)-5-methyluracil, 12.0 ml. of acetic anhydride, and 0.5 ml. of anhydrous pyridine was heated in a bath at 69° to 77° C. for 70 hours, the reaction mixture being swirled intermittently and moisture being excluded. A trace of insoluble material was removed by filtering the reaction mixture through a bed of filter aid. The filter bed was washed with acetic anhydride, and the washings were combined with the filtrate. The volatile components were then removed from the combined filtrate and washings by distillation at 0.2 to 0.5 mm. pressure and a bath temperature of about 50° C. The residue was dissolved in absolute ethanol, and the ethanol was removed at a bath temperature of about 40° C. and 0.2 to 0.5 mm. pressure. This procedure was repeated 3 times. The amorphous solid thus obtained was dissolved in chloroform and the chloroform solution was washed twice with ice-water, twice with cold 3 N sulfuric acid, twice with cold saturated aqueous sodium bicarbonate solution, and twice with ice-water. The washed chloroform solution was then swirled intermittently with decolorizing charcoal. The charcoal was removed by filtering, the filter was washed with chloroform, and the combined filtrate and washings were dried over anhydrous sodium sulfate. The chloroform was then removed under reduced pressure at a bath temperature of about 40° C. The residue was dissolved in absolute ethanol, the ethanol was removed by evaporation at a bath temperature of 30° to 40° C. and 0.2 to 0.5 mm. pressure, and the residue was maintained at a bath temperature of 30° to 40° C. and 0.2 to 0.5 mm. pressure for 3 hours. There was thus obtained 1.43 g. of 1-(2,3,5-tri-O-acetyl-β-D-lyxofuranosyl)-5-methyluracil.

Part B.—Preparation of 1-(2,3,5-Tri-O-Acetyl-β-D-Lyxofuranosyl)-4-Thio-5-Methyluracil A mixture of 1.27 g. (3.31 millimoles) of 1-(2,3,5-tri-O-acetyl-β-D-lyxofuranosyl)-5-methyluracil (prepared in Part A), 0.816 g. (3.67 millimoles) of phosphorus pentasulfide, and 25.0 ml. of anhydrous pyridine was gently refluxed, with exclusion of moisture, for 2¾ hours. The reaction mixture was cooled and the yellow supernatant solution was pipetted into a mixture of crushed ice and water. A tarry residue in the reaction vessel was washed twice with pyridine and the washings were added to the ice-water mixture, which was then refrigerated at 0° C. for 12 hours. A small amount of insoluble solid was removed by filtering, the filter was washed with water, and the solid was discarded. The combined filtrate and washings were chilled and acidified with cold 12 N sulfuric acid. The acidified mixture was refrigerated at 0° C. and the resulting pale yellow, amorphous precipitate was collected on a filter and then dissolved in chloroform. The filtrate was extracted three times with chloroform and the pooled extracts were combined with the chloroform solution containing the aforesaid pale yellow amorphous precipitate. The combined solution was washed twice with ice-water, twice with cold 3 N sulfuric acid, twice with cold saturated aqueous sodium bicarbonate solution, and twice with ice-water. The washed solution was dried over anhydrous sodium sulfate, and the chloroform was removed by distillation at reduced pressure and a bath temperature of 30° to 60° C. The yellow residue thus obtained was dissolved in absolute methanol and the methanol was removed at a bath temperature of about 50° C., first at 20 to 30 mm. pressure, and then at 0.2 to 0.5 mm. pressure. There was thus obtained 1.18 g. of bright yellow, amorphous 1-(2,3,5-tri-O-acetyl-β-D-lyxofuranosyl)-4-thio-5-methyluracil.

Part C.—Preparation of 1-(β-D-lyxofuranosyl)-5-Methylcytosine

A quantity, 0.990 g. (2.462 millimoles) of the 1-(2,3,5-tri-O-acetyl-β-D-lyxofuranosyl)-4-thio-5-methyluracil prepared in Part B, was placed in a glass liner and mixed with 70 ml. of absolute methanol which had been saturated with anhydrous ammonia at 0° C. The mixture was heated in a steel bomb at 95° to 105° C. for 35 hours. After cooling the bomb and venting, the reaction mixture was transferred to a round-bottom flask. The methanol and excess ammonia were removed at reduced pressure and a bath temperature of 45° to 50° C. The residue was held at a bath temperature of about 40° C. and 20 to 30 mm. pressure for 14 hours, and then at 0.2 to 0.5 mm. pressure and a bath temperature of 50° C. to 60° C. The resulting solid was triturated with absolute ethanol. The ethanolic mixture was refrigerated at 0° C. and the solid product was collected on a filter and washed, first with cold absolute ethanol, then with anhydrous ether. After drying in vacuo over phosphorus pentoxide there was obtained 640 mg. of 1-(β-D-lyxofuranosyl)-5-methylcytosine having a melting point of 140° to 150° C.

Ultraviolet absorption:

$\lambda_{min.}^{0.1\,N\,NaOH}$ 253–255 mμ

$\lambda_{min.}^{H_2O}$ 254–255 mμ

$\lambda_{min.}^{0.1\,N\,HCl}$ 244–246 mμ

$\lambda_{max.}^{0.1\,N\,NaOH}$ 279 mμ

$\lambda_{max.}^{H_2O}$ 279–280 mμ

$\lambda_{max.}^{0.1\,N\,HCl}$ 287–289 mμ

Part D.—Preparation of 1-(β-D-Lyxofuranosyl)-5-Methylcytosine Hydrochloride

A quantity, 300 mg. (1.165 millimoles) of 1-(β-D-lyxofuranosyl)-5-methylcytosine prepared in Part C, was comminuted to a powder. The powder was suspended in 10 ml. of absolute methanol and solution was effected by introducing anhydrous hydrogen chloride. The solution was stirred with decolorizing charcoal, and the mixture was warmed and filtered through a bed of filter aid. The filter bed was washed with a warm solution of dry hydrogen chloride in absolute methanol. The combined filtrate and washings were heated gently, and the warm solution was diluted slowly with four times its volume of anhydrous ether. A gummy material separated, and solidified when kneaded with a glass rod. The mixture was then stored at 0° C. for 12 hours. The resulting white solid was collected on a filter, washed with anhydrous ether, and dried in air. The yield of crude product thus obtained was 260 mg., having a melting point of 168.5° to 170.5° C. On recrystallization from absolute ethanol-anhydrous ether, 1-($\beta$-D-lyxofuranosyl)-5-methylcytosine hydrochloride having a melting point of 169° to 171.5° C. was obtained.

*Analysis.*—Calculated for $C_{10}H_{16}ClN_3O_5$: C, 40.89; H, 5.49; Cl, 12.07; N, 14.34. Found: C, 41.01; H, 5.46; Cl, 12.09; N, 14.43.

Optical rotation: $[\alpha]_D^{23°}$ +83° (c. 0.774, $H_2O$).
Ultraviolet absorption:

$\lambda_{min.}^{0.1\ N\ NaOH}$ 252–253 m$\mu$ ($A_M$ 4,203)

$\lambda_{min.}^{H_2O}$ 249–250 m$\mu$ ($A_M$ 3,273)

$\lambda_{min.}^{0.1\ N\ HCl}$ 242–244 m$\mu$ ($A_M$ 867)

$\lambda_{max.}^{0.1\ N\ NaOH}$ 277–278 m$\mu$ ($A_M$ 9,031)

$\lambda_{max.}^{H_2O}$ 280 m$\mu$ ($A_M$ 9,685)

$\lambda_{max.}^{0.1\ N\ HCl}$ 212–213 m$\mu$; 285–286m$\mu$ ($A_M$ 11,465; 12,120)

Characteristic infrared absorption frequencies (cm.$^{-1}$): 3460, 3220, 3120; 2720, 2640, 2600; 1705–1690, 1648; 1535–1515; 1265, 1237, 1110, 1075, 1050.

$R_f$ 0.73 (65% (v./v.) aqueous isopropanol—2 N HCl, descending).

*Part E.—Preparation of 1-($\beta$-D-Lyxofuranosyl)-5-Methylcytosine Picrate*

To a solution of 50 mg. of 1-($\beta$-D-lyxofuranosyl)-5-methylcytosine (prepared in Part C) in 0.5 ml. of water was added 4.5 ml. of a saturated aqueous solution of picric acid. A bright yellow crystalline precipitate began to form almost immediately. The reaction vessel was stoppered and kept at 25° for 71 hours, and was then refrigerated at 0° C. for 12 hours. The yellow crystalline product was collected on a filter, washed repeatedly with ice-water, and dried in air. There was thus obtained 35 mg. of crude product having a melting point of 118.5° to 120° C. On recrystallization from water, 1-($\beta$-D-lyxofuranosyl)-5-methylcytosine picrate having a melting point of 120° to 122° C. was obtained.

*Analysis.*—Calculated for $C_{16}H_{18}N_6O_{12}$: N, 17.28. Found: N, 16.93.

Characteristic infrared absorption frequencies (cm.$^{-1}$): 3580, 3440, 3220, 3100, 3050, 2710; 1722, 1673, 1628, 1595, 1530, 1488; 1565, 1555, 1345, 1325; 1298, 1165, 1135, 1123, 1098, 1045, 1020; 780, 765, 740, 705.

This application is a continuation-in-part of application Serial No. 802,650, filed March 30, 1959, now abandoned.

I claim:

1. The process which comprises reacting phosphorus pentasulfide with a fully acylated uracil-1-nucleoside, wherein the acyl groups are those of a monocarboxylic acid, to produce the corresponding fully acylated 4-thiouracil-1-nucleoside, and hydrolyzing the acyl groups and substituting an amino group at the 4-position by reaction with a basic nitrogenous compound having a replaceable N-hydrogen to produce cytosine-1-nucleoside.

2. The process which comprises reacting phosphorus pentasulfide with a fully acylated uracil-1-nucleoside, wherein the acyl groups are those of a monocarboxylic acid, to produce the corresponding fully acylated 4-thiouracil-1-nucleoside, and hydrolyzing the acyl groups to produce 4-thiouracil-1-nucleoside.

3. The process which comprises reacting phosphorus pentasulfide with a fully acylated uracil-1-nucleoside, wherein the acyl groups are those of a monocarboxylic acid, to produce the corersponding fully acylated 4-thiouracil-1-nucleoside.

4. A process which comprises reacting phosphorus pentasulfide with a fully acylated uracil-1-nucleoside, wherein the acyl groups are those of a monocarboxylic acid, which uracil-1-nucleoside has the following structural formula:

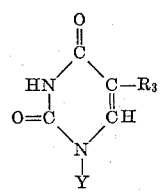

wherein Y is the sugar moiety of the nucleoside; and $R_3$ is selected from the group consisting of hydrogen, alkyl having from 1 to 8 carbon atoms, inclusive, alkenyl having from 3 to 8 carbon atoms, inclusive, cycloalkyl having from 4 to 8 carbon atoms, inclusive, cycloalkenyl having from 4 to 8 carbon atoms, inclusive, aryl having from 6 to 10 carbon atoms, inclusive, aralkyl having from 7 to 10 carbon atoms, inclusive, hydroxyl, and nitro, to produce the corresponding 4-thiouracil-1-nucleoside.

5. A process for preparing cytosine-1-nucleosides having the following structural formula:

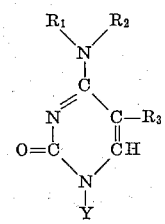

wherein Y is the sugar moiety of the nucleoside; $R_3$ is selected from the group consisting of hydrogen, alkyl having from 1 to 8 carbon atoms, inclusive, alkenyl having from 3 to 8 carbon atoms, inclusive, cycloalkyl having from 4 to 8 carbon atoms, inclusive, cycloalkenyl having from 4 to 8 carbon atoms, inclusive, aryl having from 6 to 10 carbon atoms, inclusive, aralkyl having from 7 to 10 carbon atoms, inclusive, hydroxyl, and nitro; wherein $R_1$ and $R_2$ taken separately are selected from the class consisting of hydrogen, alkyl alkenyl, cycloalkyl, cycloalkenyl, oxa-, thia-, and C-aza-monoheterocyclic radicals, oxa-, thia-, and C-aza-monoheterocyclic-lower-alkyl radicals, aryl, and aralkyl; and wherein $R_1$ and $R_2$ taken together with —N< constitute a heterocyclic radical containing no more than 10 carbon atoms and from 5 to 7 ring members, one of which, in addition to the imino nitrogen atom, is selected from the class consisting of carbon, nitrogen, oxygen, and sulfur, the other ring members being carbon, which comprises reacting phosphorus pentasulfide with a fully acylated uracil-1-nucleoside, wherein the acyl groups are those of a monocarboxylic acid, which uracil-1-nucleoside has the following structural formula:

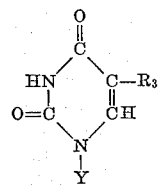

wherein Y and $R_3$ are as defined above to form a fully acylated 4-thiouracil-1-nucleoside, and deacylating by base hydrolysis and substituting the 4-thio group by aminolysis with a basic nitrogenous compound having the formula

wherein $R_1$ and $R_2$ are as defined above.

6. Fully acylated 4-thiouracil-1-nucleoside having the following structural formula:

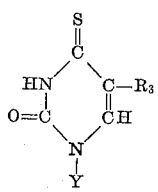

wherein $R_3$ is selected from the group consisting of hydrogen, alkyl containing from 1 to 8 carbon atoms, inclusive, alkenyl containing from 3 to 8 carbon atoms, inclusive, cycloalkyl containing from 4 to 8 carbon atoms, inclusive, cycloalkenyl containing from 4 to 8 carbon atoms, inclusive, aryl containing from 6 to 10 carbon atoms, inclusive, aralkyl containing from 7 to 10 carbon atoms, inclusive, hydroxyl and nitro; and Y is a sugar radical containing from 5 to 6 carbon atoms, and wherein the acyl groups are the acyl radicals of monocarboxylic acids selected from the group consisting of hydrocarbon monocarboxylic acids containing from 2 to 12 carbon atoms, inclusive, and halo-, nitro-, hydroxy-, amino-, cyano-, thiocyano-, and lower-alkoxy-substituted hydrocarbon monocarboxylic acids containing from 2 to 12 carbon atoms, inclusive.

7. Fully acylated 1-pentofuranosyl-4-thiouracil according to claim 6.

8. 1-(2,3,5-tri-O-acetyl-β-D-arabinofuranosyl)-4-thiouracil.

9. 1 - (2,3,5 - tri - O - acetyl - β - D - ribofuranosyl) - 4-thio-5-methyluracil.

10. 1 - 3,5 - di - O - acetyl - 2 - deoxy - β - D - ribofuranosyl)-4-thio-5-methyluracil.

11. 1 - (3,5 - di - O - acetyl - 2 - deoxy - β - D - xylofuranosyl)-4-thio-5-methyluracil.

12. 1 - (2,3,5 - tri - O - acetyl - β - D - lyxofuranosyl)-4-thio-5-methyl-uracil.

13. 1 - (2,3,5 - trio - O - benzoyl - β - D - xylofuranosyl)-4-thio-5-methyluracil.

14. 1 - (2,3,5 - tri - O - acetyl - β - D - ribofuranosyl)-4-thiouracil.

15. 1 - (2,3,4,6 - tetra - O - acetyl - β - D - glucopyranosyl)-4-thio-5-methyluracil.

16. 4-thiouracil-1-nucleoside having the following structural formula:

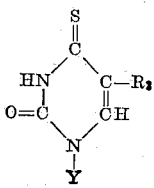

wherein $R_3$ is selected from the group consisting of hydrogen, alkyl containing from 1 to 8 carbon atoms, inclusive, alkenyl containing from 3 to 8 carbon atoms, inclusive, cycloalkyl containing from 4 to 8 carbon atoms, inclusive, aryl containing from 6 to 10 carbon atoms, inclusive, aralkyl containing from 7 to 10 carbon atoms, inclusive, hydroxyl, and nitro; and Y is a sugar radical containing from 5 to 6 carbon atoms.

17. 1-pentofuranosyl-4-thiouracil according to claim 16.

18. 1 - (2 - deoxy - β - D - ribofuranosyl) - 4 - thio - 5-methyluracil.

19. 1-(β-D-ribofuranosyl)-4-thiouracil.

20. 1-(β-D-glucopyranosyl)-4-thio-5-methyluracil.

21. 1 - arabinofuranosyl - 4 - amino - 2(1H)pyrimidones having the following structural formula:

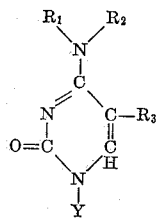

wherein Y is arabinofuranosyl; $R_1$ and $R_2$ taken separately are selected from the class consisting of hydrogen, alkyl, alkenyl, cycloalkyl, cycloalkenyl, oxa-, thia-, and C-aza-monoheterocyclic radicals, oxa-, thia-, and C-aza-monoheterocyclic-lower-alkyl radicals, aryl, and aralkyl; wherein $R_1$ and $R_2$ taken together with —N< constitute a heterocyclic radical containing no more than 10 carbon atoms and from 5 to 7 ring members, one of which, in addition to the imino nitrogen aotm, is selected from the class consisting of carbon, nitrogen, axygen, and sulfur, the other ring members being carbon; and wherein $R_3$ is selected from the group consisting of hydrogen, alkyl having from 1 to 8 carbon atoms, inclusive, alkenyl having from 3 to 8 carbon atoms, inclusive, cycloalkyl having from 4 to 8 carbon atoms, inclusive, cycloalkenyl having from 4 to 8 carbon atoms, inclusive, aryl having from 6 to 10 carbon atoms, inclusive, aralkyl having from 7 to 10 carbon atoms, inclusive, hydroxyl, and nitro; and acid addition salts thereof.

22. 1 - β - D - arabinofuranosyl - 4 - amino - 2(1H)-pyrimidones having the following structural formula:

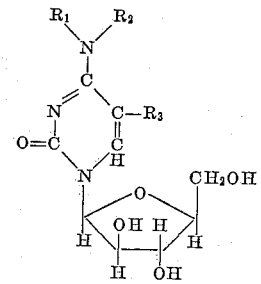

wherein $R_1$ and $R_2$ taken separately are selected from the class consisting of hydrogen, alkyl, alkenyl, cycloalkyl, cycloalkenyl, oxa-, thia-, and C-aza-monoheterocyclic radicals, oxa-, thia-, and C-aza-monoheterocyclic-lower-alkyl radicals, aryl, and aralkyl; wherein $R_1$ and $R_2$ taken together with —N< constitute a heterocyclic radical containing no more than 10 carbon atoms and from 5 to 7 ring members, one of which, in addition to the imino nitrogen atom, is selected from the class consisting of carbon, nitrogen, oxygen, and sulfur, the other ring members being carbon; and wherein $R_3$ is selected from the group consisting of hydrogen, alkyl having from 1 to 8 carbon atoms, inclusive, alkenyl having from 3 to 8 carbon atoms, inclusive, cycloalkyl having 4 to 8 carbon atoms, inclusive, cycloalkenyl having from 4 to 8 carbon atoms, inclusive, aryl having from 6 to 10 carbon atoms, inclusive, aralkyl having from 7 to 10 carbon atoms, inclusive, hydroxyl, and nitro; and acid addition salts thereof.

23. 1-β-D-arabinofuranosylcytosine.

24. 1-β-D-arabinofuranosylcytosine acid addition salt.

25. 1-β-D-arabinofuranosylcytosine hydrochloride.

26. 1-(β-D-arabinofuranosyl)-N-alkylcytosine.

27. 1-(β-D-arabinofuranosyl)-N-methylcytosine.

28. 1-(β-D-arabinofuranosyl)-N-methylcytosine hydrochloride.

29. 1-(β-D-arabinofuranosyl)-N,N-ethylenecytosine.

30. 1 - (β - D - arabinofuranosyl) - N,N - ethylenecytosine acid addition salt.

31. 1 - ($\beta$ - D - arabinofuranosyl) - N,N - ethylenecytosine hydrochloride.

References Cited in the file of this patent

UNITED STATES PATENTS

| | | |
|---|---|---|
| 2,815,342 | Khorana | Dec. 3, 1957 |
| 3,002,965 | Fox et al. | Oct. 3, 1961 |

OTHER REFERENCES

Brown: Jr. of Chemical Soc. (England), July 1956, pages 2388–2393.

Newmark et al.: Jr. Am. Chem. Soc. 71, November 1949, page 3747.

Pizer et al.: Am. Chem. Soc. Abstracts, 136th Meeting, September 13 to 18, 1959, page 9C.